(12) United States Patent
Broom et al.

(10) Patent No.: US 9,478,093 B2
(45) Date of Patent: Oct. 25, 2016

(54) ITEM DISPENSING APPARATUS

(75) Inventors: Ward Broom, Snellville, GA (US); Kyle Joiner, Roswell, GA (US); Keith Stallings, Dacula, GA (US); Robert Fitzgerald, Suwanee, GA (US); Joel Eisler, Lawrenceville, GA (US)

(73) Assignee: Innovative Product Achievements, LLC, Suwanee, GA (US)

( * ) Notice: Subject to any disclaimer, the term of this patent is extended or adjusted under 35 U.S.C. 154(b) by 159 days.

(21) Appl. No.: 13/397,196

(22) Filed: Feb. 15, 2012

(65) Prior Publication Data

US 2013/0211585 A1    Aug. 15, 2013

(51) Int. Cl.
| | |
|---|---|
| G06F 17/00 | (2006.01) |
| E05B 65/52 | (2006.01) |
| B65D 83/00 | (2006.01) |
| G07F 11/62 | (2006.01) |
| B62B 3/00 | (2006.01) |

(52) U.S. Cl.
CPC ............... *G07F 11/62* (2013.01); *B62B 3/004* (2013.01); *B62B 3/003* (2013.01)

(58) Field of Classification Search
CPC ....... B62B 3/003; B62B 3/004; B65D 83/00; E05B 65/52
USPC .................................. 221/154, 282; 700/237
See application file for complete search history.

(56) References Cited

U.S. PATENT DOCUMENTS

| | | |
|---|---|---|
| 328,224 A | 10/1885 | Jacobson |
| 2,202,358 A | 5/1940 | Stone |
| 3,055,419 A | 9/1962 | Rubin et al. |
| 3,058,320 A | 10/1962 | Foster et al. |
| 3,116,097 A | 12/1963 | Novales |
| 3,249,294 A | 5/1966 | Hughes et al. |
| 3,282,382 A | 11/1966 | Thompson |
| 3,392,543 A | 7/1968 | Miller |
| 3,439,725 A | 4/1969 | Haimovitz |
| 3,455,621 A | 7/1969 | Kingsley |
| 3,464,509 A | 9/1969 | Gray |
| 3,639,919 A * | 2/1972 | White ...................... A47K 3/38 4/558 |

(Continued)

FOREIGN PATENT DOCUMENTS

| | | |
|---|---|---|
| CN | 201909966 U | 7/2011 |
| EP | 0553470 A1 | 8/1993 |

(Continued)

OTHER PUBLICATIONS

LTL Home Products, Inc., "Spectrum Folding Doors," Mar. 30, 2009 to Jul. 12, 2012, Internet Archive <http://web.archive.org/web/20090330195345/http://www.ltlhomeproducts.com/oakmont-folding-doors.php>, 1 page.

(Continued)

*Primary Examiner* — Michael K Collins
(74) *Attorney, Agent, or Firm* — Alston & Bird LLP

(57) ABSTRACT

Various embodiments of the present invention are directed to a dispenser configured for storing one or more items and dispensing the stored items to authorized users. According to various embodiments, the dispenser generally includes a housing defining an interior portion dimensioned to receive one or more items and a laterally sliding access door comprised of a flexible barrier configured to provide restricted access to items stored within the dispenser. In various embodiments, the dispenser also includes a biasing system configured bias the access door to a closed position.

22 Claims, 15 Drawing Sheets

(56) References Cited

U.S. PATENT DOCUMENTS

| | | | |
|---|---|---|---|
| 3,687,546 A * | 8/1972 | Endebrock et al. | 355/73 |
| 3,690,118 A | 9/1972 | Rainwater | |
| 3,712,363 A | 1/1973 | Thomassen et al. | |
| 3,719,408 A | 3/1973 | Fullington | |
| 3,752,550 A | 8/1973 | Niemeyer | |
| 3,785,669 A | 1/1974 | Doheny | |
| 3,807,480 A * | 4/1974 | Smart | A62C 2/16 160/1 |
| 3,834,865 A | 9/1974 | Lee | |
| 3,861,768 A | 1/1975 | Wilson | |
| 4,034,572 A | 7/1977 | Morris et al. | |
| 4,037,526 A | 7/1977 | Jaekle | |
| 4,077,228 A | 3/1978 | Schumacher et al. | |
| 4,108,363 A | 8/1978 | Susumu | |
| 4,192,436 A | 3/1980 | Schuller et al. | |
| 4,365,854 A | 12/1982 | Waller | |
| 4,401,216 A | 8/1983 | Koch | |
| 4,491,375 A | 1/1985 | Ugalde | |
| 4,509,577 A | 4/1985 | Priefert | |
| 4,974,658 A | 12/1990 | Komatsu et al. | |
| 4,976,301 A | 12/1990 | Easley et al. | |
| 5,067,630 A | 11/1991 | Nesser et al. | |
| 5,085,261 A * | 2/1992 | Bortoluzzi | E05D 15/26 160/199 |
| 5,163,495 A | 11/1992 | Lichy | |
| 5,370,722 A | 12/1994 | Simmons | |
| 5,379,823 A | 1/1995 | Kraeutler | |
| 5,385,265 A | 1/1995 | Schlamp | |
| 5,657,805 A | 8/1997 | Magro | |
| 5,683,221 A | 11/1997 | Ablabutyan | |
| 5,724,764 A | 3/1998 | Alsup | |
| 5,875,597 A | 3/1999 | Gingrich et al. | |
| 5,964,270 A | 10/1999 | Kirkey et al. | |
| 6,024,153 A | 2/2000 | Goldman | |
| 6,282,914 B1 | 9/2001 | Steinhoff et al. | |
| 6,385,505 B1 | 5/2002 | Lipps | |
| 6,397,916 B1 | 6/2002 | Bengtsson et al. | |
| 6,409,187 B1 | 6/2002 | Crow, Jr. | |
| 6,409,589 B1 | 6/2002 | Laconico, Jr. et al. | |
| 6,450,598 B1 * | 9/2002 | Hanel | 312/268 |
| 6,502,718 B2 * | 1/2003 | Fitzgerald et al. | 221/131 |
| 6,510,566 B2 | 1/2003 | Bryce | |
| 6,595,606 B1 | 7/2003 | Gunst | |
| 6,615,894 B1 * | 9/2003 | McKeon | E05D 15/12 160/1 |
| 6,626,508 B1 | 9/2003 | Hase et al. | |
| 6,848,491 B2 * | 2/2005 | Gambarelli et al. | 160/122 |
| 6,910,302 B2 * | 6/2005 | Crawford | 49/379 |
| 6,994,409 B2 | 2/2006 | Godlewski | |
| 7,134,242 B2 | 11/2006 | Fitzgerald | |
| 7,353,658 B2 | 4/2008 | Voute et al. | |
| 7,407,238 B2 * | 8/2008 | Fitzgerald | 312/311 |
| 7,428,447 B2 | 9/2008 | Stonikas et al. | |
| 7,628,410 B2 * | 12/2009 | Fitzgerald et al. | 280/47.35 |
| 7,874,562 B2 | 1/2011 | Fitzgerald et al. | |
| 8,744,621 B2 | 6/2014 | Michael | |
| 8,763,672 B2 * | 7/2014 | Smart | E05F 15/605 160/188 |
| 9,208,635 B2 * | 12/2015 | Fitzgerald | E05B 47/023 |
| 9,245,406 B2 | 1/2016 | Fitzgerald et al. | |
| 2002/0130135 A1 | 9/2002 | Fitzgerald et al. | |
| 2003/0025424 A1 | 2/2003 | Graves | |
| 2003/0221797 A1 | 12/2003 | Schaller | |
| 2004/0031574 A1 | 2/2004 | Gambarelli et al. | |
| 2004/0206462 A1 | 10/2004 | Fitzgerald et al. | |
| 2004/0245272 A1 * | 12/2004 | Fitzgerald et al. | 221/90 |
| 2005/0060938 A1 | 3/2005 | Fitzgerald | |
| 2006/0230683 A1 | 10/2006 | Hung | |
| 2006/0250056 A1 | 11/2006 | Fitzgerald | |
| 2006/0266770 A1 | 11/2006 | Fitzgerald | |
| 2007/0073441 A1 | 3/2007 | Stonikas et al. | |
| 2007/0080519 A1 | 4/2007 | Murdock | |
| 2008/0272137 A1 | 11/2008 | Fitzgerald et al. | |
| 2008/0272139 A1 | 11/2008 | Fitzgerald | |
| 2008/0272141 A1 * | 11/2008 | Fitzgerald | A47B 46/00 221/154 |
| 2008/0272564 A1 | 11/2008 | Fitzgerald et al. | |
| 2008/0272565 A1 * | 11/2008 | Fitzgerald | A47F 3/06 280/47.35 |
| 2013/0123978 A1 * | 5/2013 | Stark et al. | 700/242 |
| 2014/0091684 A1 | 4/2014 | Fitzgerald et al. | |

FOREIGN PATENT DOCUMENTS

| | | |
|---|---|---|
| EP | 1061013 A | 12/2000 |
| EP | 1382273 A1 | 1/2004 |
| JP | 2004035267 A | 2/2004 |

OTHER PUBLICATIONS

Wilson Quality Safety Products, "Accordion Fold Curtains," Feb. 16, 2007 to Feb. 9, 2010, Internet Archive <http://web.archive.org/web/20070216072132/http://www.wilsonindustries.com/partitions-accordion_fold_curtains.htm>, 1 page.

Servicor Cleanroom Products, "Sliding Track Curtains," Feb. 25, 2002 to Dec. 31, 2008, Internet Archive <http://web.archive.org/web/20080509191632/http://www.servicor.com/slidingcurtain.html>, 1 page.

International Searching Authority, International Search Report and Written Opinion for International Application No. PCT/US2013/026074, May 15, 2013, 9 pages, European Patent Office, The Netherlands.

State Intellectual Property Office of the P.R.C., First Office Action for Application No. 201380019466.X, Jan. 25, 2016, 22 pages, China.

* cited by examiner

ITEM DISPENSING APPARATUS

BACKGROUND OF THE INVENTION

1. Field of the Invention

Various embodiments of the present invention described herein generally relate to item dispensers, and, in particular, to access doors configured for preventing access to one or more items stored within an item dispenser.

2. Description of Related Art

Item dispensers are frequently used to dispense a variety of items, such as food products, toiletries, and other goods to various users. In the healthcare industry, dispensers are often placed in hospitals and used to distribute linens, surgical scrubs, and other healthcare items to members of a hospital's staff. These dispensers can be configured to store such items on shelves disposed within the dispenser, or on moveable carts that can be wheeled into an interior portion of a dispenser. To prevent access to the stored items, the dispensers may include a lockable access door that can be opened by an authorized user.

However, there is an ongoing need in the art for dispensers that enable an authorized user to more easily access stored items. In addition, as energy conservation and efficient use of space are high priorities in various industries, there is a need for dispensers that consume less power during operation and that have a more efficient footprint. Furthermore, in view of increasing efforts to reduce operational cost, there is also a need for dispensers that are more reliable and that can be manufactured at a lower cost.

BRIEF SUMMARY OF THE INVENTION

Various embodiments of the present invention are directed to a dispenser for storing one or more items and providing selective access to the items. According to various embodiments, the dispenser comprises a housing defining an access opening and an interior portion dimensioned for receiving the one or more items; at least one upper horizontal support member disposed adjacent an upper perimeter of the access opening; and an access door disposed adjacent the access opening. In various embodiments, the access door comprises a flexible barrier and a plurality of door attachment members disposed adjacent an upper edge of the flexible barrier and engaged with the upper horizontal support member. The plurality of door attachment members are configured to slide relative to the upper horizontal support member and permit the access door to move laterally to (i) a closed position in which the access door prevents access to one or more items stored within the interior portion of the housing through the access opening, and (ii) an open position in which the access door does not prevent access to one or more items stored within the interior portion of the housing through the access opening.

Various other embodiments of the present invention are directed to a dispenser for storing one or more items and providing selective access to the items. According to various embodiments, the dispenser comprises a housing defining an access opening and an interior portion dimensioned for receiving the one or more items; at least one upper horizontal support member disposed adjacent an upper perimeter of the access opening; at least one lower horizontal support member disposed adjacent a lower perimeter of the access opening; and an access door disposed adjacent the access opening. In various embodiments, the access door comprises a flexible barrier; a first plurality of door attachment members disposed adjacent an upper edge of the flexible barrier and engaged with the upper horizontal support member; and a second plurality of door attachment members disposed adjacent a lower edge of the flexible barrier and engaged with the lower horizontal support member. The first plurality of door attachment members are configured to slide relative to the upper horizontal support member and the second plurality of door attachment members are configured to slide relative to the lower horizontal support member in order to permit the access door to move laterally to (i) a closed position in which the access door prevents access to one or more items stored within the interior portion of the housing through the access opening, and (ii) an open position in which the access door does not prevent access to one or more items stored within the interior portion of the housing through the access opening.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION OF THE INVENTION

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Overview

Various embodiments of the present invention are directed to a dispenser configured for storing one or more items and dispensing the stored items to authorized users. According to various embodiments, the dispenser generally includes a housing defining an interior portion dimensioned to receive one or more items. As an example, the interior portion may include one or more shelves configured for supporting a plurality of items, or may define an open space dimensioned to receive a movable cart configured for supporting various items. In order to provide selective access to items within the dispenser, various embodiments include a movable access door configured for being moved to an open position, in which a user has access to items stored within the dispenser, and a closed position, in which a user is prevented for accessing items stored within the dispenser.

As described in greater detail herein, various embodiments of the dispenser's access door are configured to enable an authorized user to more easily access items stored within the dispenser. For example, in various embodiments, the access door is configured to slide in a lateral direction relative to the dispenser's housing such that an authorized user can easily adjust the access door to the open or closed position. In addition, certain embodiments of the dispenser include a biasing system configured to automatically close the access door when an authorized user has finished retrieving items from the dispenser. For example, in one embodiment, the biasing system includes a counterweight assembly that functions to close the access door without the need for a motor. As described in greater detail herein, such embodiments can reduce the overall power consumption of the dispenser and improve the reliability of the dispenser. Furthermore, certain embodiments of the access door and biasing system have a compact configuration that conserves space within the dispenser to provide a large interior space with a reduced footprint. Moreover, as described in detail below, various embodiments of the dispensers described herein are comprised of low-cost, reliable components that serve to improve reliability and reduce the overall manufacturing cost of the dispenser.

Dispenser with Integrated Item Support Features

Figure 1:
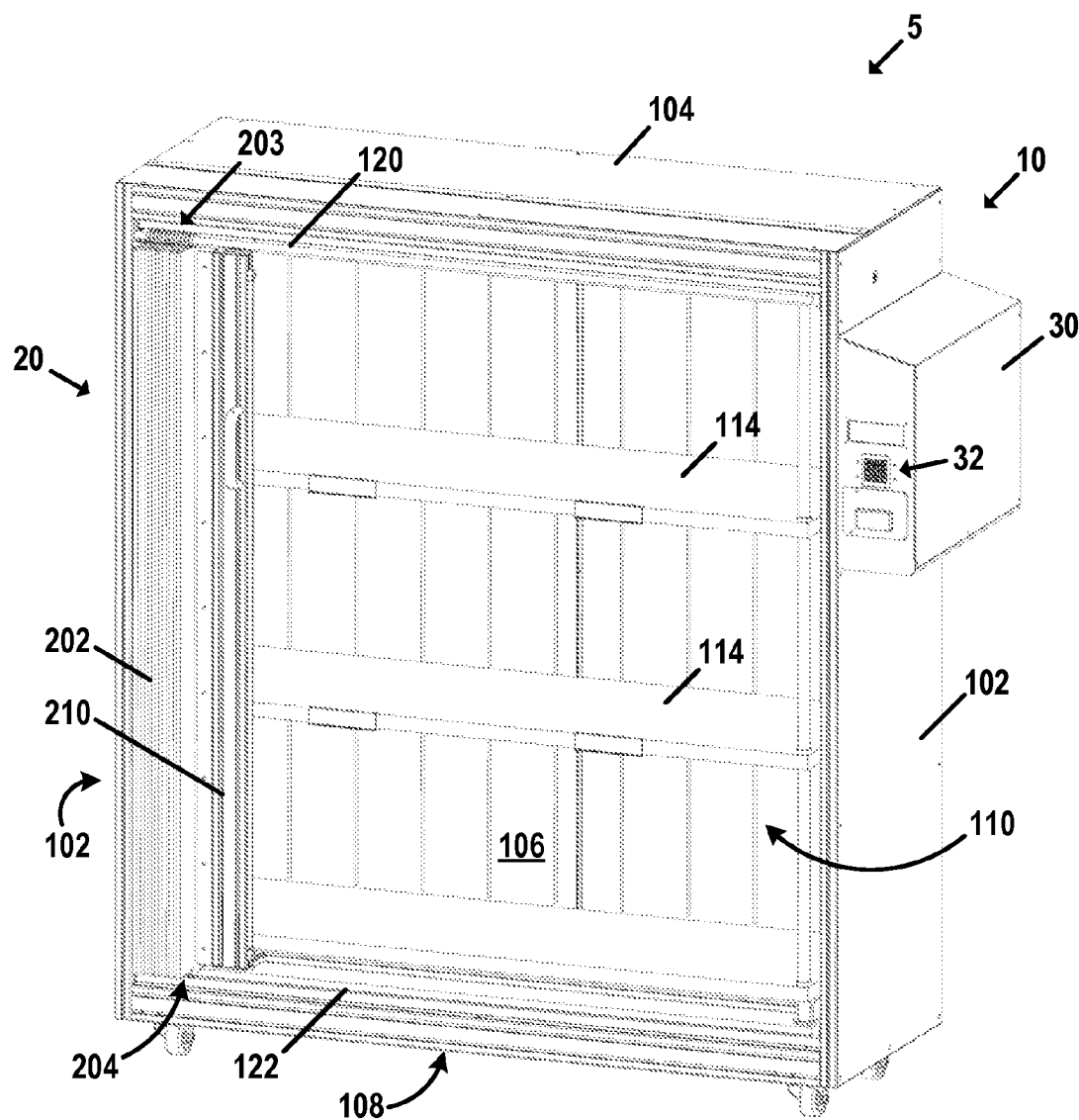
FIG. 1 shows a perspective view of a dispenser having an access door in an open position according to one embodiment of the present invention.

FIG. 1 illustrates a dispenser 5 according to one embodiment. As shown in FIG. 1, the dispenser 5 generally includes a housing 10, an access door 20, and a control system 30. As described in greater detail below, the access door 20 is configured to slide laterally relative to the housing 10 in order to prevent or permit access to an interior portion of the housing 10 configured for storing one or more items. To restrict access to authorized users only, the control system 30 is generally configured to control one or more locking mechanisms configured to lock and unlock the access door 20 based on input received from a user.

In the illustrated embodiment of FIG. 1, the housing 10 includes a pair of side panels 102, an upper panel 104, a rear panel 106, and a bottom panel 108. According to various embodiments, the panels 102-108 may be formed from any suitable structural material (e.g., metal or high-strength plastics), and may comprise separately connected panels or may be formed from a single piece of shaped structural material. As shown in FIG. 1, the housing's panels 102-108 define an interior portion accessible through an access opening 110. In the illustrated embodiment, the interior portion includes a plurality of substantially horizontal, substantially rectangular shelves 114. The shelves 114 are vertically spaced from one another and are configured to function as item support features for supporting a plurality of items disposed in the interior portion of the housing 10. For example, when configured for application in the healthcare industry, the shelves 114 can support various linens, scrubs, or the like. However, as will be appreciated from the description herein, various other item support features may be provided in the interior portion of the housing 10 in addition to, or in place of, the shelves 114. For example, in certain embodiments, various slot or cubby holes dimensioned for receiving items are disposed in the interior portion of the housing 10. In addition, certain embodiments of the dispenser 5 may not include item support features within the housing's interior portion.

According to various embodiments, the access door 20 is operatively connected to the housing 10 adjacent the housing's access opening 110. As described in greater detail below, the access door 20 is configured to slide laterally between an open position, in which the access door 20 permits access to items stored within the interior portion of the housing 10, and a closed position, in which the access door 20 prevents access to items stored within the interior portion of the housing 10. For example, FIG. 1 illustrates the access door 20 in an open position, while FIG. 2 illustrates the access door 20 in a closed position according to one embodiment.

Figure 2:
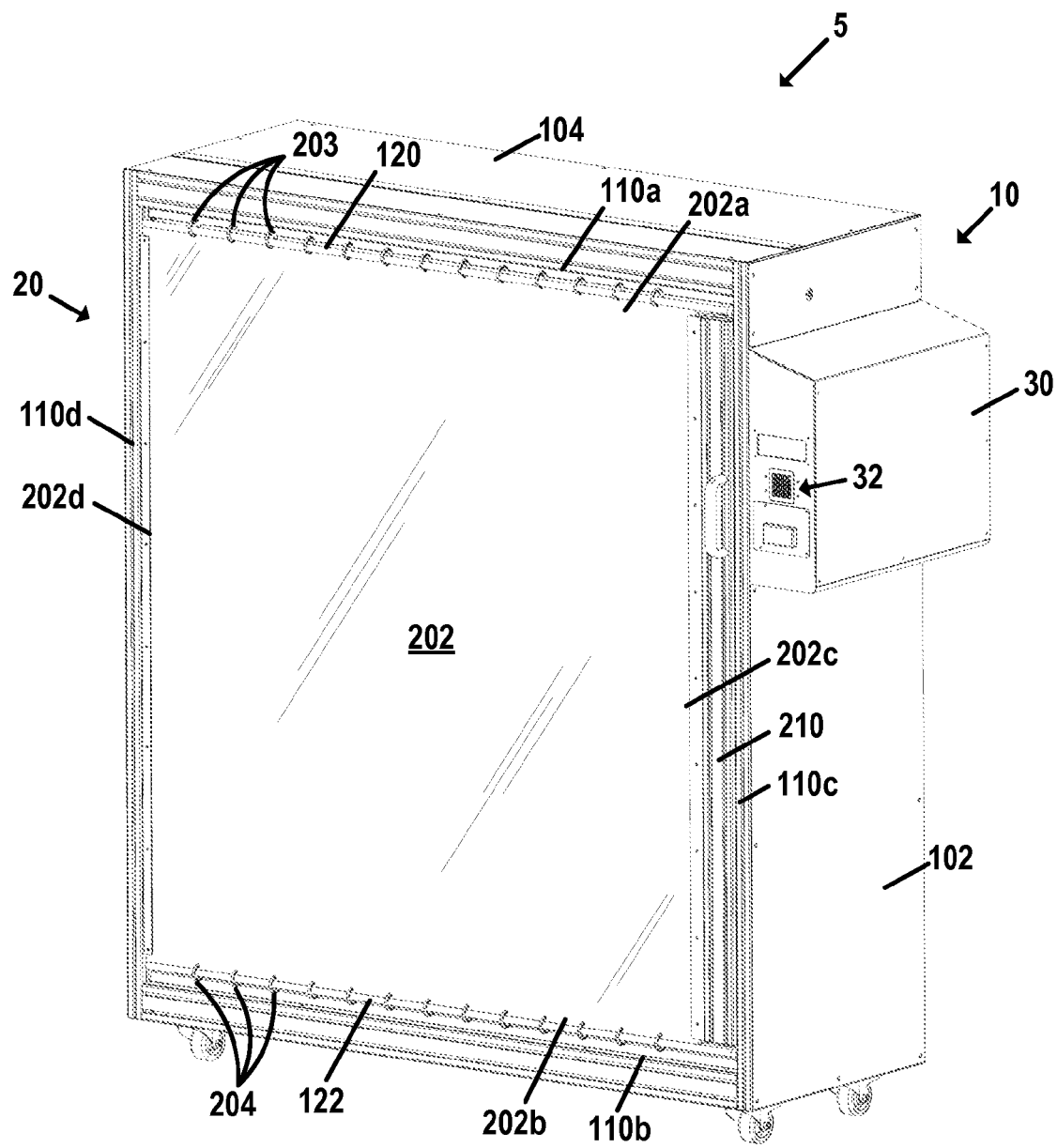
FIG. 2 shows a perspective view of a dispenser having an access door in a closed position according to one embodiment of the present invention.

In the illustrated embodiment of FIGS. 1 and 2, the access door 20 comprises a flexible barrier 202 and a vertical support member 210. According to various embodiments, the flexible barrier 202 may comprise a fabric sheet made from a tear-resistant material (e.g., ballistic nylon, polyester, Kevlar® fabric). However, as will be appreciated from the description herein, the flexible barrier may be formed from any flexible material of suitable durability and strength. In addition, as used herein, the terms "vertical" and "horizontal" are intended to refer to components oriented generally vertically or generally horizontally. Although such components may be oriented exactly vertically or horizontally with respect to a support surface, the terms vertical and horizontal are not intended to indicate that such an exact orientation is required.

As shown in FIG. 2, the upper and lower edges 202a, 202b of the flexible barrier 202 are operatively connected to the housing 10 by a first plurality of door attachment members comprising a first set of rings 203 and a second plurality of door attachment members comprising a second set of rings 204. The first set of rings 203 are disposed along the flexible barrier's upper edge 202a and are engaged with an upper horizontal support member comprising an upper horizontal guide rod 120. Likewise, the second set of rings 204 are disposed along the flexible barrier's lower edge 202b and are engaged with a lower horizontal support member comprising a lower horizontal guide rod 122. In the illustrated embodiment of FIG. 2, the upper and lower horizontal guide rods 120, 122 extend across the width of the housing's access opening 110 and are connected to the housing 10 adjacent the access opening's upper perimeter 110a and lower perimeter 110b, respectively. As will be appreciated from the description herein, the upper and lower horizontal guide rods 120, 122 may comprise separate rod members attached to the housing 10, or may comprise rod members formed from a portion of the housing 10 itself. Together, the rings 203, 204 and the horizontal guide rods 120, 122 function to secure the flexible barrier 202 to the housing 10 such that the flexible barrier 202 extends substantially across the height of the access opening 110 and is laterally movable between the aforementioned open and closed positions.

Figure 3:
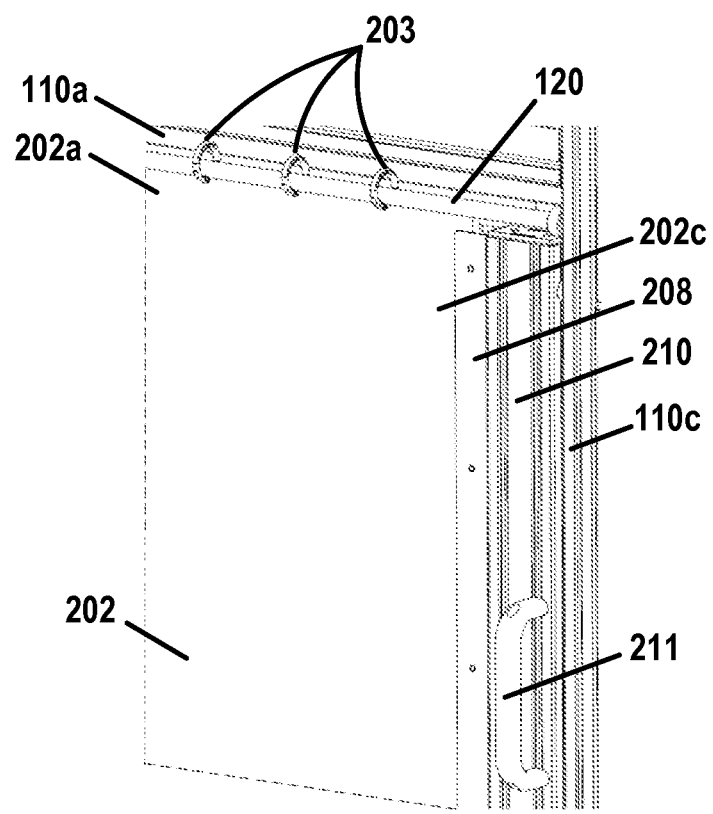
FIG. 3 shows a perspective view of an upper portion of an access door according to one embodiment of the present invention.
Figure 4:
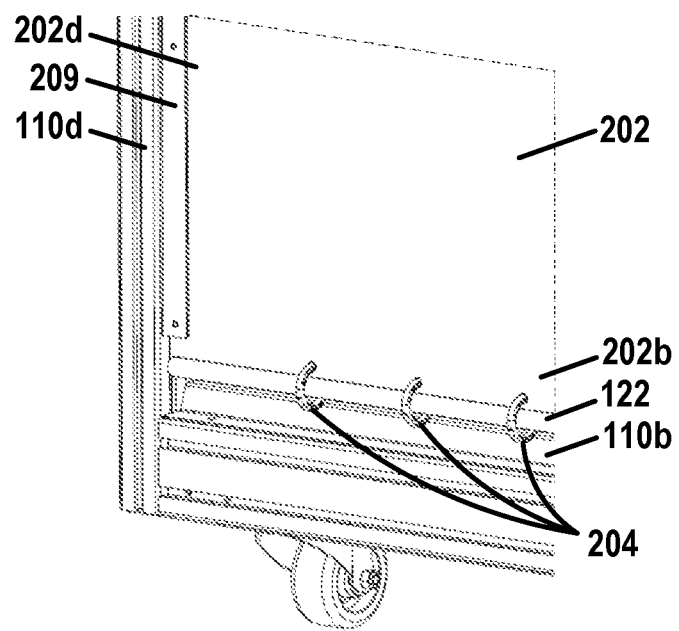
FIG. 4 shows a perspective view of a lower portion of an access door according to one embodiment of the present invention.

FIG. 3 shows an exterior view of an upper portion of the flexible barrier 202 and the first set of rings 203. In the illustrated embodiment, each of the rings 203 extends around the upper horizontal guide rod 120 such that it may slide laterally along the upper horizontal guide rod 120. In addition, each of the rings 203 extends through a hole in the flexible barrier 202 such that, together, the rings 203 operatively connect the upper edge 202a of the flexible barrier 202 to the upper horizontal guide rod 120. Similarly, FIG. 4 shows an exterior view of a lower portion of the flexible barrier 202 and the second set of rings 204. As shown in FIG. 4, each of the rings 204 extends around the lower horizontal guide rod 122 such that it may slide laterally along the lower horizontal guide rod 122. In addition, each of the rings 204 extends through a hole in the flexible barrier 202 such that, together, the rings 204 operatively connect the lower edge 202b of the flexible barrier 202 to the lower horizontal guide rod 122.

Referring back to FIG. 2, the flexible barrier 202 is also attached along its side edges 202c, 202d to the vertical support member 210 and housing 10, respectively. In the illustrated embodiment of FIG. 2, the vertical support member 210 comprises a generally elongated member slidably connected to the housing 10 and oriented substantially vertically such that it extends across the full height of the access opening 110. In various embodiments, the vertical support member 210 is generally rigid and comprised of a high-strength metal material, such as steel or aluminum. However, as will be appreciated from the description herein, the vertical support member 210 may be comprised of various materials of suitable strength and rigidity. In various embodiments, the vertical support member 210 is configured to slide laterally relative to the housing 10 in order to permit the access door 20 to move between its open and closed positions. For example, in the closed position shown in FIGS. 2 and 3, the vertical support member 210 is positioned adjacent a first lateral side 110c of the housing's access opening 110. To adjust the access door 20 to its open position, the vertical support member 210 can be moved laterally toward the access opening's opposite, second lateral side 110d. In addition, in the illustrate embodiment of FIG. 3, the vertical support member 210 includes a handle 211 configured to enable a user to easily adjust the position of the vertical support member 210.

As shown in FIG. 2, a first side edge 202c of the flexible barrier 202 is attached to the vertical support member 210. In particular, in the illustrated embodiment of FIG. 3, the flexible barrier's first side edge 202c is clamped between a C-shaped attachment member 208 secured to the vertical support member 210. However, as will be appreciated from the description herein, the flexible barrier's first side edge 202c can be attached to the vertical support member 210 with various other attachment devices or methods (e.g., using an adhesive or a plurality of fastening devices).

In addition, the second side edge 202d of the flexible barrier is attached to the housing 10 adjacent the second lateral side 110d of the access opening 110. As shown in FIG. 4, the flexible barrier's second side edge 202d is clamped between a C-shaped attachment member 209 secured to the housing 10 along the access opening's second lateral side 110d. However, as will be appreciated from the description herein, the flexible barrier's second side edge 202d can be attached to the housing 10 with various other attachment devices or methods (e.g., using an adhesive or a plurality of fastening devices).

Figure 5:
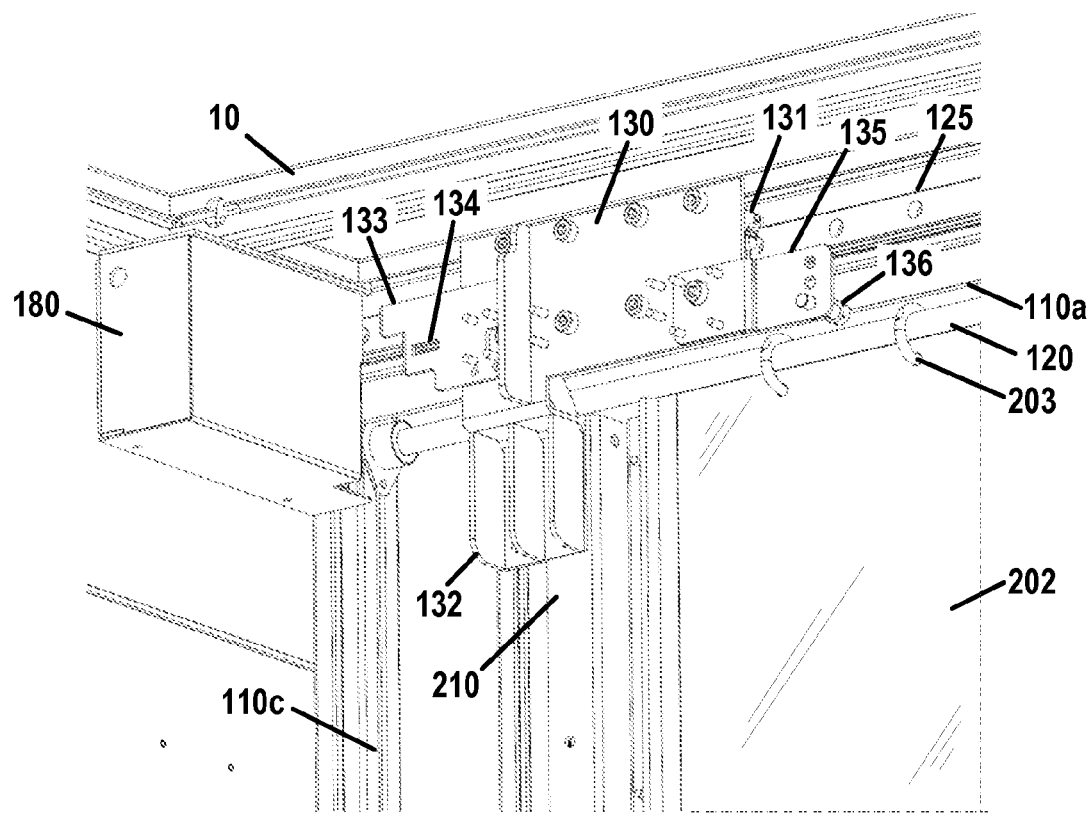
FIG. 5 shows an interior perspective view of an access door, an upper sliding assembly, and a close locking mechanism according to one embodiment of the present invention.

In the illustrated embodiment of FIGS. 1 and 2, the vertical support member 210 is slidably connected to the housing 10 at both its upper and lower ends by an upper sliding assembly 130 and a lower sliding assembly 160, respectively. FIG. 5 shows an upper portion of the vertical support member 210 as viewed from the interior portion of the housing 10 according to one embodiment. As shown in FIG. 5, the upper portion of the vertical support member 210 is operatively connected to the upper sliding assembly 130 by a lower bracket 132. The upper sliding assembly 130 is configured to slide laterally along a second upper horizontal support member comprising an upper guide rail 125. In various embodiments, the upper guide rail 125 is disposed on an interior portion of the housing 10 slightly above the access opening's upper perimeter 110a and extends substantially horizontally across the housing 10 such that it spans the width of the access opening 110.

The upper sliding assembly 130 includes a bearing block 131 configured to engage the upper guide rail 125 such that the upper sliding assembly 130 can slide smoothly along the upper guide rail 125. In various embodiments, the bearing block 131 and upper guide rail 125 may comprise a commercially available rail and slide unit (e.g., an IKO unit having part number MHTG20C1R1540HS2/T, or an Igus® unit having part numbers WS-10 and WJRM-01-10-LL). In addition, the upper sliding assembly 130 includes a first lateral flange 133 defining an aperture 134, and a second lateral flange 135 including a bolt 136. As described in greater detail below, the first and second lateral flanges 133, 135 are configured to engage locking mechanisms disposed on the housing 10 in order to enable the access door 20 to be locked in an open or closed position.

Figure 6:
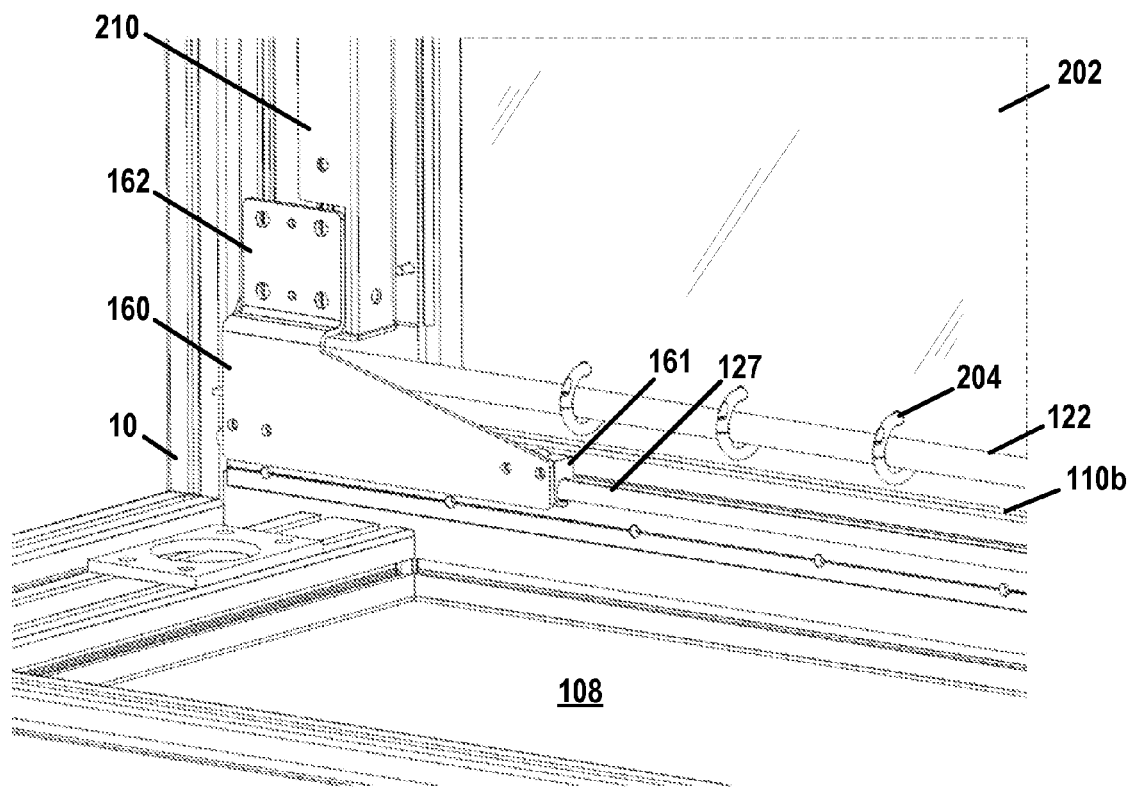
FIG. 6 shows an interior perspective view of an access door and a lower sliding assembly according to one embodiment of the present invention.

FIG. 6 shows a lower portion of the vertical support member 210 as viewed from the interior portion of the housing 10 according to one embodiment. As shown in FIG. 6, the lower portion of the vertical support member 210 is operatively connected to a lower sliding assembly 160 by an upper bracket 162. The lower sliding assembly 160 is configured to slide laterally along a second lower horizontal support member comprising a lower guide rail 127. In various embodiments, the lower guide rail 127 is disposed on an interior portion of the housing 10 slightly below the access opening's lower perimeter 110b and extends substantially horizontally across the housing 10 such that it spans the width of the access opening 110. The lower sliding assembly 160 includes a bearing block 161 configured to engage the lower guide rail 127 such that the lower sliding assembly 160 can slide smoothly along the lower guide rail 127. In various embodiments, the bearing block 161 and lower guide rail 127 may comprise a commercially available rail and slide unit (e.g., an Igus® unit having part numbers WS-10 and WJRM-01-10-LL, or an IKO unit having part number MHTG20C1R1540HS2/T).

As noted above, the vertical support member's 210 ability to slide laterally along the upper and lower guide rails 125, 127 enables the access door 20 to be adjusted between an open and closed position. For example, FIG. 2 illustrates the access door 20 in a closed position according to one embodiment. With the access door 20 in the closed position of FIG. 2, the access door's flexible barrier 202 substantially spans the height and width of the housing's access opening 110. As such, items disposed within the interior portion of the housing are inaccessible to users outside of the dispenser 5 with the access door in the closed position. In particular, in the closed position of FIG. 2, the vertical support member 210 is positioned against the housing 10 adjacent the access opening's first lateral side 110c and the flexible barrier's first side edge 202c is secured along the vertical support member 210. On the opposite side, the flexible barrier's second side edge 202d is secured to the housing 10 adjacent the access opening's second lateral side 110d. Thus, in the closed position of FIG. 2, there is no space for a human hand of average size to access the interior portion of the housing 10 along the flexible barrier's side edges 202c, 202d.

In addition, in the illustrated embodiment of FIG. 2, the rings 203, 204 are spaced apart along the flexible barrier's upper and lower edges 202a, 202b such that—when the flexible barrier 202 is outstretched in the closed position of FIG. 2—the rings 203, 204 are spaced apart from one another a distance that prevents a human hand of average size from fitting between the rings 203, 204. Likewise, in the illustrated embodiment of FIG. 2, the access opening's upper and lower perimeters 110a, 110b, the upper and lower horizontal guide rods 120, 122, and the flexible barrier's upper and lower edges 202a, 202b are positioned proximately to one another such that a human hand of average size cannot be inserted between them and into the interior portion of the housing 10. Thus, in the closed position of FIG. 2, there is no space for a human hand of average size to access the interior portion of the housing 10 along the flexible barrier's upper edges 202a, 202b.

FIG. 1 illustrates the access door 20 in an open position according to one embodiment. In contrast to FIG. 2, FIG. 1 shows the access door 20 with the vertical support member 210 moved laterally toward the access opening's second lateral side 110d. With the vertical support member 210 moved to the position of FIG. 1, the flexible barrier 202 is compressed into a plurality of folds and does not obstruct access to the interior portion of the housing 10 through the access opening 110.

According to various embodiments, the aforementioned components of the access door 20 enable the access door 20 to be easily moved by a user between the open and closed positions of FIGS. 1 and 2. For example, in the illustrated embodiment of FIGS. 1-6, the upper and lower guide rods 120, 122; rings 203, 204; upper and lower guide rails 125, 127; and upper and lower sliding assemblies 130, 160 provide a low-friction system for sliding the access door 20 between its open and closed positions. In addition, the flexible barrier 202 and vertical support member 210 enable the access door 20 to be of relatively light weight, further reducing the effort necessary to move the access door 20. Moreover, the laterally sliding nature of the access door 20 enables a user to move the access door from a comfortable position.

Figure 7:
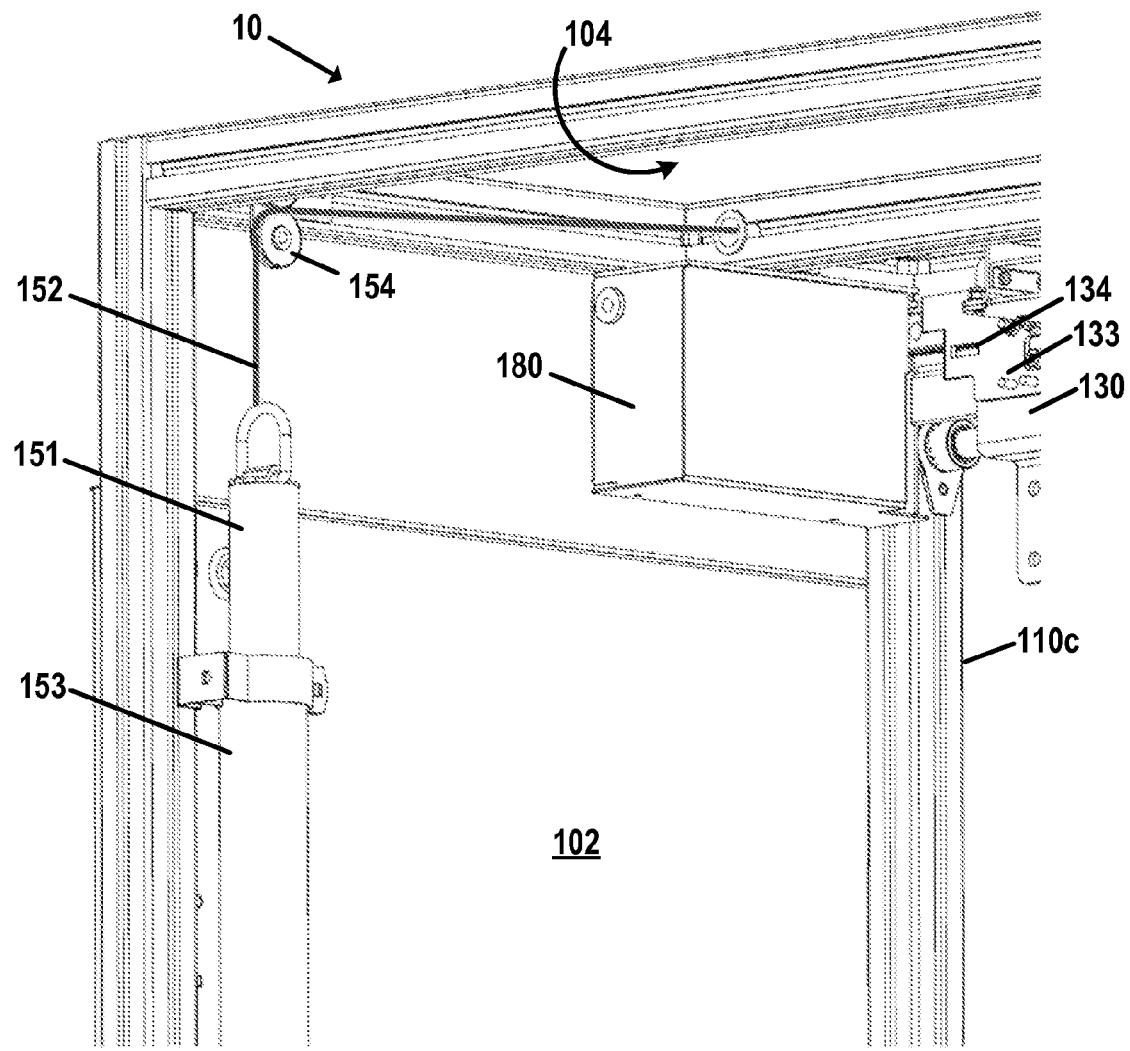
FIG. 7 shows an interior perspective view of a biasing system, an upper sliding assembly, and a close locking mechanism according to one embodiment of the present invention.
Figure 8:
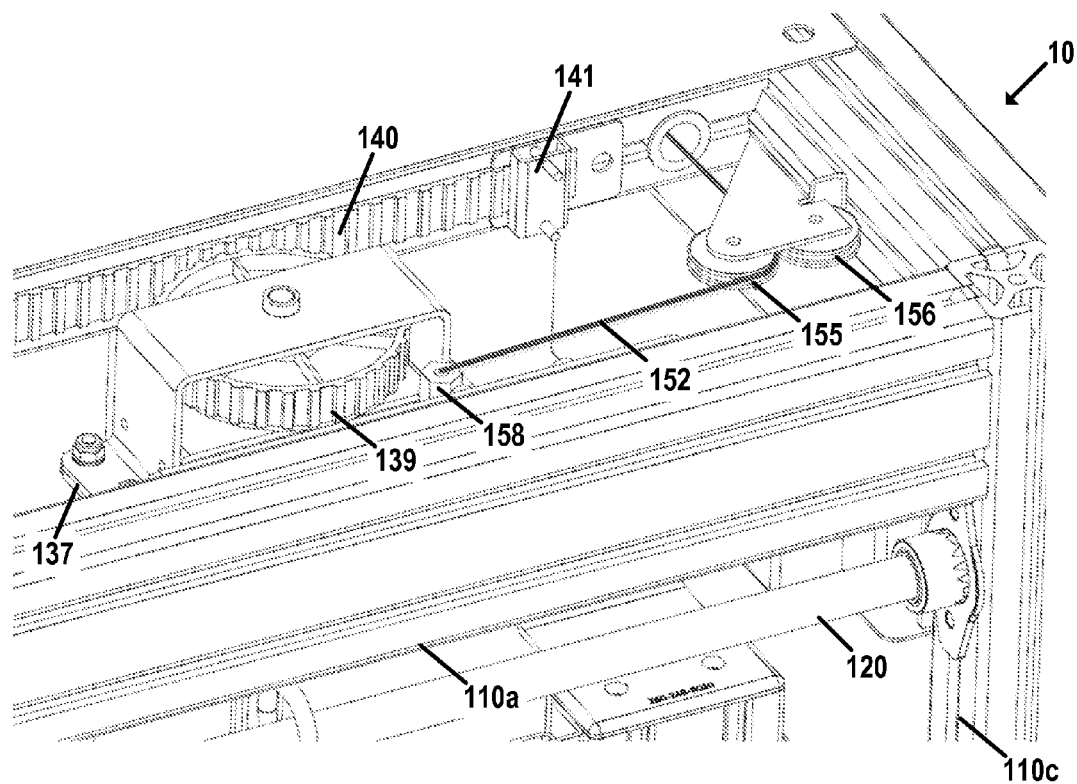
FIG. 8 shows a perspective view of a biasing system according to one embodiment of the present invention.
Figure 9:
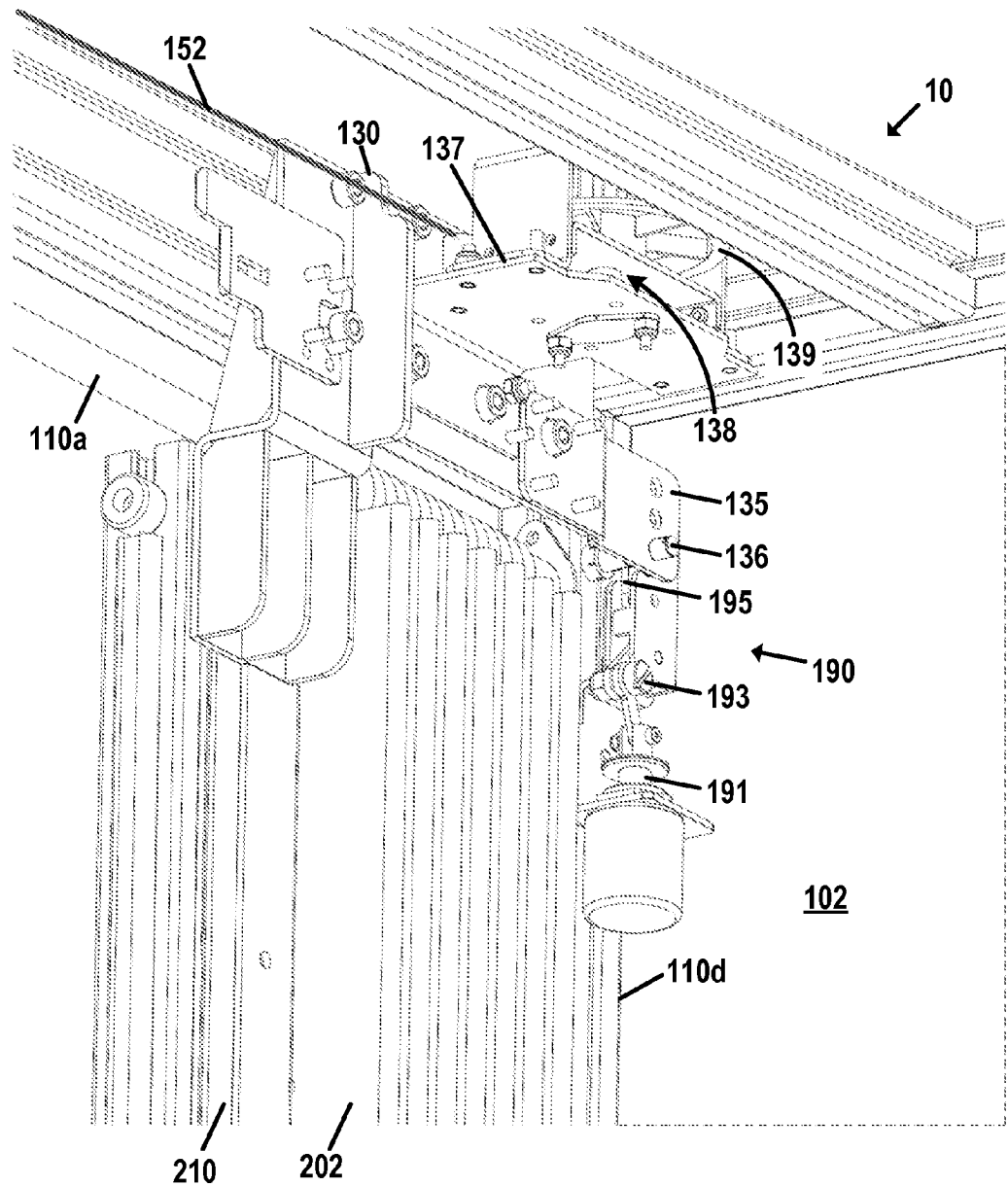
FIG. 9 shows an interior perspective view of a biasing system, an upper sliding assembly, and an open locking mechanism according to one embodiment of the present invention.

According to various embodiments, the dispenser 5 also includes a biasing system configured to bias the access door 20 to the closed position of FIG. 2. FIGS. 7-9 illustrate various aspects of the dispenser's biasing system according to one embodiment. As shown in FIGS. 7-9, the biasing system generally comprises a counterweight 151 operatively connected to the upper sliding assembly 130 by a wire 152. FIG. 7 shows a portion of the dispenser's biasing system as viewed from the rear of the housing 10 with the housing's rear panel 106 removed. As shown in FIG. 7, a first end of the wire 152 is connected to the counterweight 151, which comprises an elongated cylindrical member (e.g., a three pound steel cylinder) configured to move substantially vertically as it is lowered and raised by the wire 152. To prevent the counterweight 151 from contacting items stored within the dispenser, the counterweight 151 is configured to move vertically in and out of a tubular member 153 secured to an interior corner of the housing 10. As can be seen in FIG. 7, the counterweight 151 and tubular member 153 are positioned adjacent the housing's side panel 102 nearest to the access opening's first lateral side 110c. In certain embodiments, the positioning and slim profile of the counterweight 151 and tubular member 153 enable the biasing system to encompass a small amount of space within the housing 10.

In the illustrated embodiment of FIG. 7, the wire 152 extends vertically upward from the counterweight 151, around a first pulley 154, and horizontally just below the housing's upper panel 104. FIG. 8 illustrates another portion of the dispenser's biasing system as viewed from above the housing 10 with the housing's upper panel 104 removed. As shown in FIG. 8, the wire 152 is threaded between second and third pulleys 155, 156 and is attached to a connecting member 158 that extends upwardly from a horizontal bracket 137. The horizontal bracket 137 is attached to the upper sliding assembly 130 and, as such, the counterweight 151 applies a downward force on the wire 152 that pulls the upper sliding assembly 130 toward the access opening's first lateral side 110c (i.e., toward the access door's closed position).

In various embodiments, the upper sliding assembly 130 also includes a rotary damping mechanism configured to damp the movement of the upper sliding assembly 130 in the access door's closing direction. For example, FIG. 9 shows the upper sliding assembly 130 as viewed from an interior portion of the housing 10 according to one embodiment. As shown in FIG. 9, the horizontal bracket 137 extends outwardly from the upper sliding assembly 130 and supports a rotary damper 138. An upper portion of the rotary damper 138 is connected to a timing pulley 139. Referring back to FIG. 8, the housing 10 includes timing belt 140 disposed substantially horizontally within the housing 10 and positioned just below the housing's upper panel 104 (removed from view in FIG. 8). In the illustrated embodiment, the timing belt 140 is secured to the housing 10, at least in part, by a clamp 141. The timing pulley 139 is positioned such that its teeth engage the teeth of the timing belt 140, thereby enabling the rotary damper 138 to damp the motion of the upper sliding assembly 130. In various embodiments, the rotary damper 138 is configured to provide rotational resistance as the upper sliding assembly 130 moves toward the access door's closed position, but not as the upper sliding assembly 130 moves toward the access door's open position, thereby enabling low-effort opening of the access door 20. However, in other embodiments, the rotary damper 138 may be configured to provide resistance in both directions of the access door 20.

According to certain embodiments, the aforementioned components of the dispenser's biasing system apply a closing force to the access door 20 such that, if a user opens the access door 20 and releases the access door 20 without securing it in an open position (e.g., via the open locking mechanism described below), the access door 20 will automatically move to the closed position shown in FIG. 2. However, the biasing system's rotary damping mechanism controls the speed with which the access door 20 moves towards the closed position. For example, in certain embodiments, the rotary damping mechanism is configured to reduce the access door's closing speed such that a human hand caught between the housing 10 and the closing access door 20 would not be harmed.

As will be appreciated from the description herein, certain embodiments of the dispenser 5—such as those including the aforementioned biasing system—may not include a powered motor. In such embodiments, the overall energy consumption and power efficiency of the dispenser 5 is improved due to the lack of a powered motor. In addition, the overall reliability and manufacturing cost of the dispenser 5 can be improved due to the simple, reliable components comprising the biasing system. Moreover, the lack of a powered motor enables a more compact design with a higher interior-capacity-to-footprint ratio as the dispenser 5 does not take up space housing a motor assembly.

In other embodiments, however, a powered motor may be provided in place of, or in addition to, the biasing system. In such embodiments, the low-friction, light weight, laterally sliding access door design of FIGS. 1-6 may be incorporated such that a relatively low power motor may be used. This also improves power consumption, reliability, manufacturing cost, and footprint efficiency.

According to various embodiments, the dispenser 5 also includes a close locking mechanism 180 and an open locking mechanism 190, which are configured to selectively lock the access door 20 in its closed and open positions, respectively. For example, in the illustrated embodiment of FIGS. 5 and 7, the close locking mechanism 180 is secured to an interior portion of the housing's side panel 102 adjacent the intersection of the access opening's upper perimeter 110a and first lateral side 110c. In the illustrated embodiment, the close locking mechanism 180 includes a latch configured to engage the aperture 134 defined by the upper sliding assembly's first lateral flange 133. In particular, the close locking mechanism 180 is configured such that, when the access door 20 is moved to its fully closed position, the close locking mechanism's latch engages the aperture 134 and prevents the access door 20 from being moved out of its closed position. Moreover, in certain embodiments, the close locking mechanism 180 is configured such that—when the access door 20 is moved to the closed position by the biasing system alone—the access door's first lateral flange 133 and aperture 134 will automatically engage the close locking mechanism's latch and secure the access door 20 in the closed position. In such embodiments, a user may lock the access door 20 in its closed position simply by releasing the access door 20 and allowing the biasing system to automatically move the access door 20 to the closed position.

To unlock the access door 20 from its closed position, the close locking mechanism 180 disengages its latch from the upper sliding assembly's aperture 134. In various embodiments, this can be accomplished automatically or manually. For example, in certain embodiments, a keyed mechanism may be provided that enables a user to insert a key into a keyhole provided on the housing 10 and disengage the close locking mechanism's latch by turning the key. In addition, a lever or button mechanism configured to mechanically disengage the latch may be used.

In other embodiments, the dispenser's control system 30 may be configured to control the close locking mechanism 180. In various embodiments, the control system 30 comprises a computing device (e.g., a processor and memory) configured to interface with one or more user input devices disposed on the exterior of the housing (e.g., a keypad, a card reader, and/or an RFID reader). For example, in the illustrated embodiment of FIGS. 1 and 2, the control system 30 is contained in a small housing on an exterior face of one of the dispenser side walls 102 and includes a user interface 32 comprising a keypad, a card reader, and a display screen.

In various embodiments, the close locking mechanism 180 may include a solenoid or other electromechanical device configured to actuate the close locking mechanism's latch in response to a control signal received from the control system 30. Thus, in one embodiment, the control system 30 may be configured to actuate the close locking mechanism's latch to unlock the closed access door 20 in response to receiving valid user input (e.g., a card swipe from a card assigned to an authorized user, or an authorization code entered via the key pad). By preventing the access door 20 from being unlocked by a user unable to provide such valid user input, the control system 30 and close locking mechanism 180 are able to prevent access to items stored in the interior portion of the housing 10. In certain embodiments, the close locking mechanism 180 may also include the aforementioned mechanical unlocking system as a redundant back-up method for unlocking the access door 20 where the automated control system 30 fails. As will be appreciated from the description herein, various embodiments of the upper sliding assembly 130 and close locking mechanism 180 may include various locking mechanisms suitable for securing the access door 20 in its closed position.

In the illustrated embodiment of FIG. 9, the open locking mechanism 190 is secured to an interior portion of the housing's side panel 102 adjacent the intersection of the access opening's upper perimeter 110a and second lateral side 110d. In the illustrated embodiment, the open locking mechanism includes a latch 195 positioned to engage the bolt 136 provided on the upper sliding assembly's second lateral flange 135. In certain embodiments, the latch 195 is configured such that, when the access door 20 is moved to its fully open position, the open locking mechanism's latch 195 engages the bolt 136 and prevents the access door 20 from being moved out of its open position. In such embodiments, a user may lock the access door 20 in its open position simply by pushing the access door 20 to its open position.

To unlock the access door 20 from its open position, the open locking mechanism 190 disengages its latch 195 from the upper sliding assembly's bolt 136. In various embodiments, this can be accomplished automatically or manually. For example, in various embodiments, a lever, button, or keyed mechanism configured to mechanically disengage the latch 195 from the bolt 136 may be provided on the exterior of the housing 10.

In other embodiments, the dispenser's control system 30 may be configured to control the open locking mechanism 190. In particular, in the illustrated embodiment of FIG. 9, the latch 195 is actuated by a solenoid 191 configured to move the latch 195 out of engagement with the bolt 136 via a linkage 193. The solenoid 191 is actuated by a control signal generated by the control system 30. In one embodiment, the control system 30 may be configured to generate the control signal in response to user input received via the dispenser's user interface 32 (e.g., a card swipe from a card assigned to an authorized user, or an authorization code entered via the key pad), or via another control mechanism provided on the housing 10. In other embodiments, the control system 30 may include a timing function that actuates the solenoid 191 and disengages the latch 195 after a programmed period of time (e.g., where the timing begins when the latch 195 engages the bolt 136). In such embodiments, the control system 30 prevents the access door 20 from being left open with the dispenser 5 unattended for an extended period of time. As will be appreciated from the description herein, according to various embodiments, the components of the open locking mechanism 190 may be adapted for use as a close locking mechanism, and the components of the close locking mechanism 180 may be adapted for use as an open locking mechanism.

According to various embodiments, the dispenser's control system 30 may be adapted to provide various other functionalities. As an example, in certain embodiments, the dispenser 5 may include a scale configured to monitor the weight of items stored in the interior portion of the housing 10 (e.g., the total weight of all items stored on the shelves 14). In such embodiments, the control system 30 may be connected to a remote server over a network that is configured to monitor the amount of items present in various dispensers connected over the network. For example, the control system 30 may be adapted for use in an inventory management system such as that disclosed in U.S. application Ser. No. 11/236,214, now U.S. Pat. No. 7,428,447, the entirety of which is herein incorporated by reference.

As will be appreciated from the description provided herein, various modifications to the dispenser 5 may be made within the scope of the present invention. For example, in regard to the flexible barrier's connection to the housing 10, the rings 203, 204 may be connected to the flexible barrier 202 in any suitable fashion (e.g., via loops or rivets disposed along the flexible barrier's upper and lower edges 202a, 202b). In addition, the rings 203, 204 may be replaced by other door attachment members suitable for sliding along the guide rods 120, 122, such as fabric loops or metal hooks. In other embodiments, the guide rods 120, 122 may be replaced with additional guide rails and the flexible barrier 202 may be operatively connected to the additional guide rails by a plurality of bearing blocks connected along the flexible barrier's upper and lower edges 202a, 202b. In other embodiments, such bearing blocks could be configured to move along the upper and lower guide rails 125, 127 along with the upper and lower sliding assemblies 130, 160.

According to various embodiments, the vertical support member 210 may also be operatively connected to the housing 10 using a variety of methods. For example, in certain embodiments, the upper and lower ends of the vertical support member 210 may be configured to slide along the upper and lower guide rods 120, 122. In other embodiments, the dispenser 5 may include a pair of vertical support members positioned on both side edges of the flexible barrier 202. In further embodiments, the vertical support member 210—and thereby the access door 20—may be angled such that it is not perpendicular to the support surface on which the dispenser 5 is positioned.

Dispenser Configured to Receive an Item Supporting Cart

Figure 10:
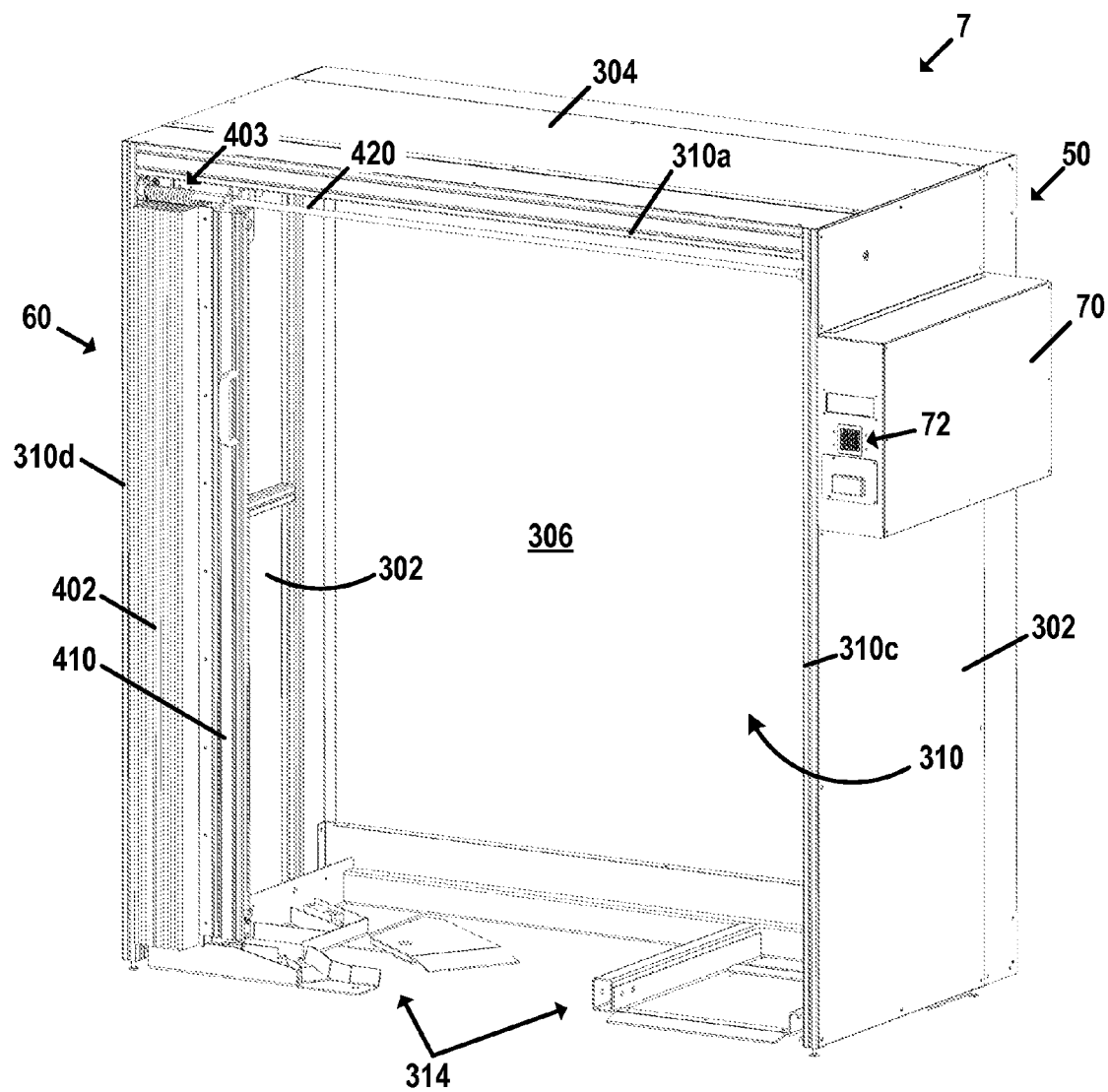
FIG. 10 shows a perspective view of a dispenser having an access door in an open position according to one embodiment of the present invention.

FIG. 10 illustrates a dispenser 7 according to another embodiment of the present invention. As shown in FIG. 10, the dispenser 7 generally includes a housing 50, an access door 60, and a control system 70. Similarly to the access door 20 shown in the illustrated embodiment of FIGS. 1 and 2, the access door 60 is configured to slide laterally relative to the housing 50 in order to prevent or permit access to an interior portion of the housing 10. However, in the illustrated embodiment of FIG. 10, the housing 50 includes a partially open lower perimeter configured to permit a movable storage cart to be moved into and out of the housing 50. Accordingly, as shown in FIG. 11, the access door 60 is operatively connected to the housing 50 along its upper edge 402a, but is unsecured along its lower edge 402b.

In the illustrated embodiment of FIG. 10, the housing 50 includes a pair of side panels 302, an upper panel 304, and a rear panel 306. As with the panels 102-108 shown in FIGS. 1 and 2, the panels 302-306 may be formed from any suitable structural material (e.g., metal or high strength plastics), and may comprise separately connected panels or be formed from a single piece of shaped structural material. As shown in FIG. 10, the housing's panels 302-306 define an interior portion accessible through an access opening 310. In the illustrated embodiment, the housing's interior portion is dimensioned for receiving a movable storage cart configured for supporting various items, such as the storage cartridge 200 disclosed in U.S. patent application Ser. No. 11/849,332, now published as U.S. Publication 2008/0272565, the entirety of which is herein incorporated by reference. In addition, as shown in FIG. 10, the dispenser 7 includes a wheel guide apparatus 314 configured for guiding a movable cart into the interior portion of the housing 50 through the access opening 310.

According to various embodiments, the dispenser's access door 60 is operatively connected to the housing 50 adjacent the housing's access opening 310, and comprises a flexible barrier 402 and a vertical support member 410. In various embodiments, the access door 60 is configured to slide laterally between an open position, in which the access door 60 permits access to items stored within the interior portion of the housing 50, and a closed position, in which the access door 60 prevents access to items stored within the interior portion of the housing 50. For example, FIG. 10 illustrates the access door 60 in an open position, while FIG. 11 illustrates the access door 60 in a closed position according to one embodiment. In many respects, the access door 60 is similar to the access door 20 of FIGS. 1 and 2. For example, the access door's flexible barrier 402 may comprise a fabric sheet made of the tear-resistant materials noted above, while the access door's vertical support member 410 may comprise an elongated member comprised of the high-strength materials noted above.

Figure 11:
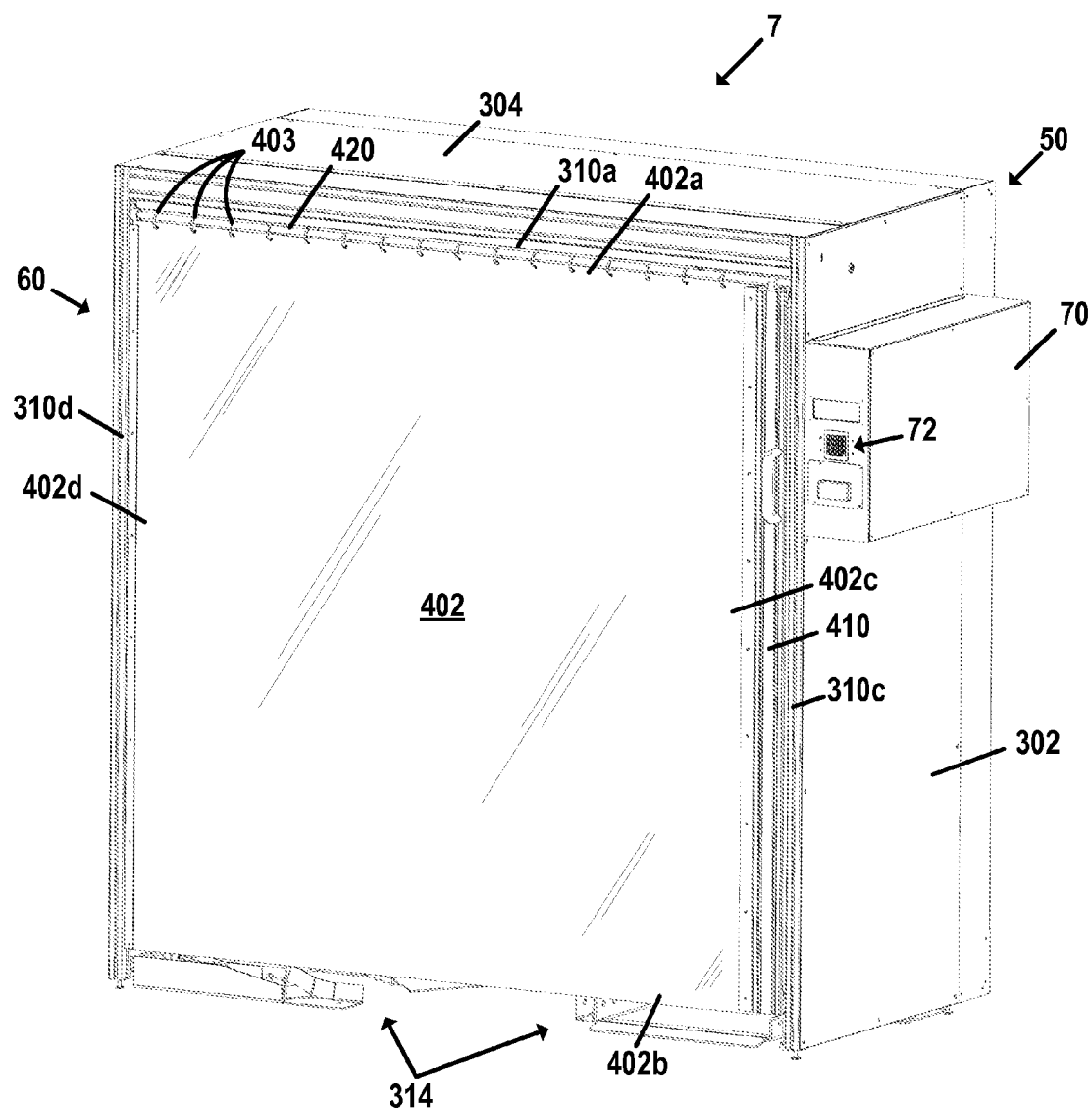
FIG. 11 shows a perspective view of a dispenser having an access door in a closed position according to one embodiment of the present invention.
Figure 12:
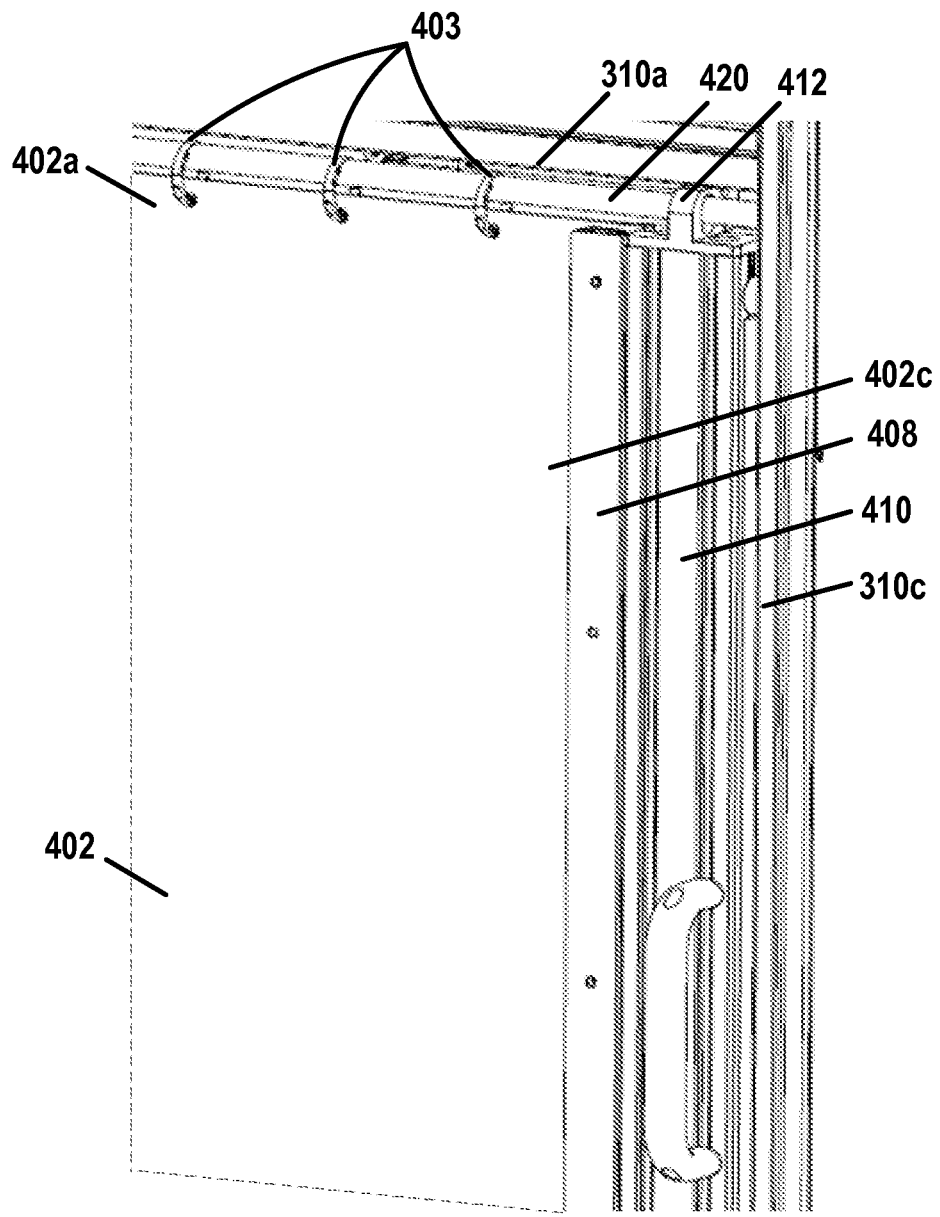
FIG. 12 shows a perspective view of an upper portion of an access door according to one embodiment of the present invention.

As shown in FIG. 11, the upper edge 402a of the flexible barrier 402 is operatively connected to the housing 50 by a first plurality of door attachment members comprising a first set of rings 403. FIG. 12 shows an exterior view of an upper portion of the flexible barrier 402 and the first set of rings 403. As shown in FIG. 12, the first set of rings 403 are disposed along the flexible barrier's upper edge 402a and are engaged with an upper horizontal support member comprising an upper horizontal guide rod 420. According to various embodiments, the rings 403 and guide rod 420 function in the manner described above in relation to the rings 203 and guide rod 120. Accordingly, as shown in FIGS. 10 and 11, the rings 403 and the upper horizontal guide rods 420 secure the flexible barrier 402 to the housing 50 such that the flexible barrier 402 extends substantially across the height of the access opening 310 and is laterally movable between the aforementioned open and closed positions.

The flexible barrier 402 is also attached along its side edges 402c, 402d to the vertical support member 410 and housing 50, respectively. According to various embodiments, the flexible barrier's side edges 402c, 402d are secured to the vertical support member 410 and housing 50 in the manner described above in relation to the flexible barrier 202, vertical support member 210, and housing 10.

In various embodiments, the vertical support member 410 is configured to slide laterally relative to the housing 50 in order to permit the access door 60 to move between its open and closed positions. In one embodiment, the vertical support member 410 is slidably connected to the housing 50 at its upper end by an upper sliding assembly configured to slide along an upper horizontal guide rail (e.g., in the manner described above in relation to the vertical support member 210 and upper sliding assembly 130). However, the vertical support member's lower end is not connected to the housing 50. Accordingly, to provide additional support to the vertical support member 410 in instances where a force is applied to the vertical support member 410 pushing it toward or away from the housing's interior portion, the vertical support member 410 is also operatively connected to the upper horizontal guide rod 420. For example, as shown in FIG. 12, the upper end of the vertical support member 410 includes a bracing member 412 that extends around the upper horizontal guide rod 420. Accordingly, when a force is applied to the vertical support member 410, the bracing member 412 engages the upper horizontal guide rod 420 to provide additional support to the vertical support member 410 and prevent the upper sliding assembly from being disengaged from its upper horizontal guide rail.

As noted above, the vertical support member's 410 ability to slide laterally enables the access door 60 to be adjusted between open and closed positions. In the closed position shown in FIG. 11, the position and orientation of the flexible barrier 402, vertical support member 410, rings 403, and upper horizontal support rod 420 prevents access to the interior portion of the housing 50 in substantially the same manner as described above in relation to the dispenser 5. However, in order to prevent outside access to the interior portion of the housing 50, the flexible barrier 402 shown in FIG. 11 is dimensioned such that its lower edge 402*b* is positioned proximate the support surface on which the dispenser 7 is resting.

Figure 13:
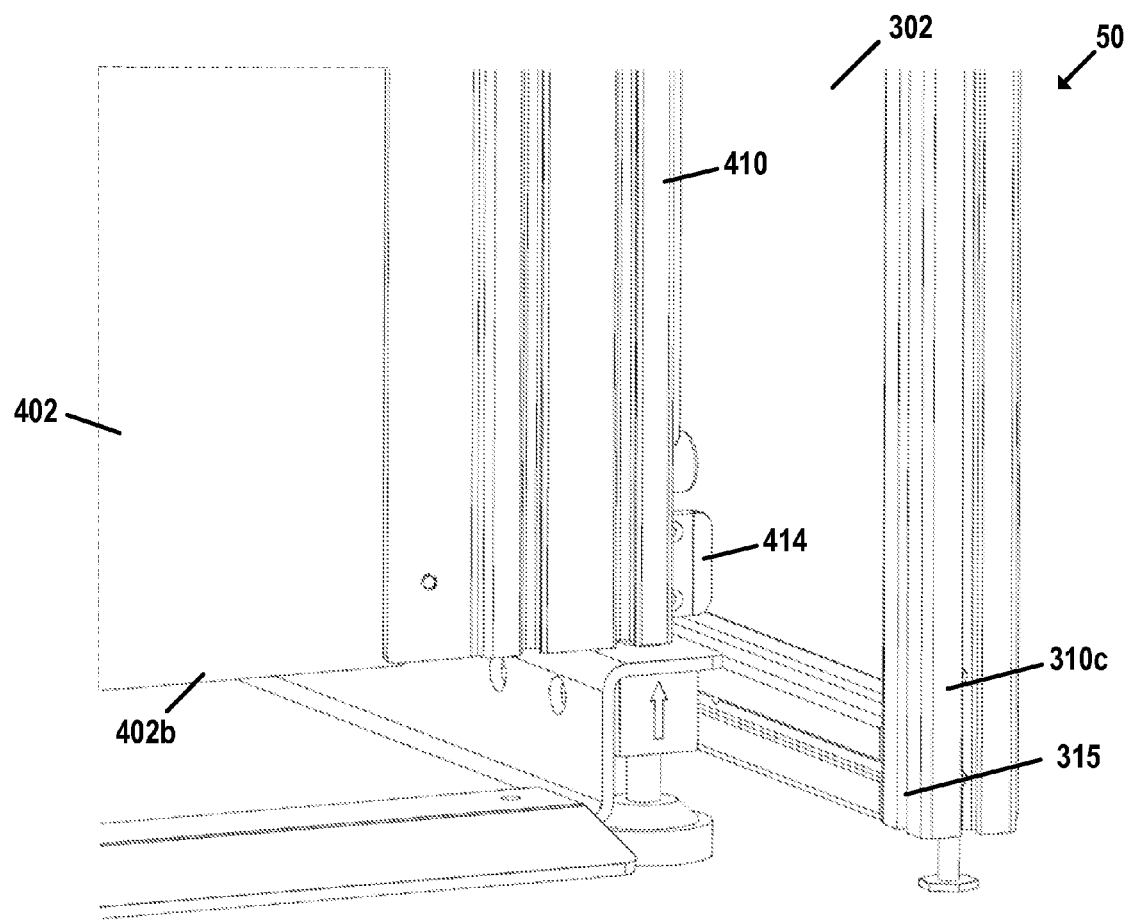
FIG. 13 shows a perspective view of a lower portion of an access door according to one embodiment of the present invention.

FIG. 13 shows an exterior view of a lower portion of the vertical support member 410 proximate the access opening's first lateral side 310*c* according to one embodiment. In order to provide additional support for the vertical support member 410 when the access door 60 is in the closed position, the vertical support member includes a lower support flange 414. As shown in FIG. 13, the lower support flange 414 extends outwardly in a lateral direction from the leading edge of the vertical support member 410 and is configured to engage a linear recess 315 defined on the housing 50 along the access opening's first lateral side 310*c*. When the access door 60 is fully closed, the vertical support member 410 is moved against the housing 50 and the lower support flange 414 is inserted into the linear recess 315. Thus, where a force is applied to the vertical support member 410 pushing it inward towards the interior portion of the housing 50, or pulling it outward away from the housing 50, the lower support flange 414 provides additional support for the vertical support member 410 and aids in securing the access door 60 in the closed position.

Figure 14:
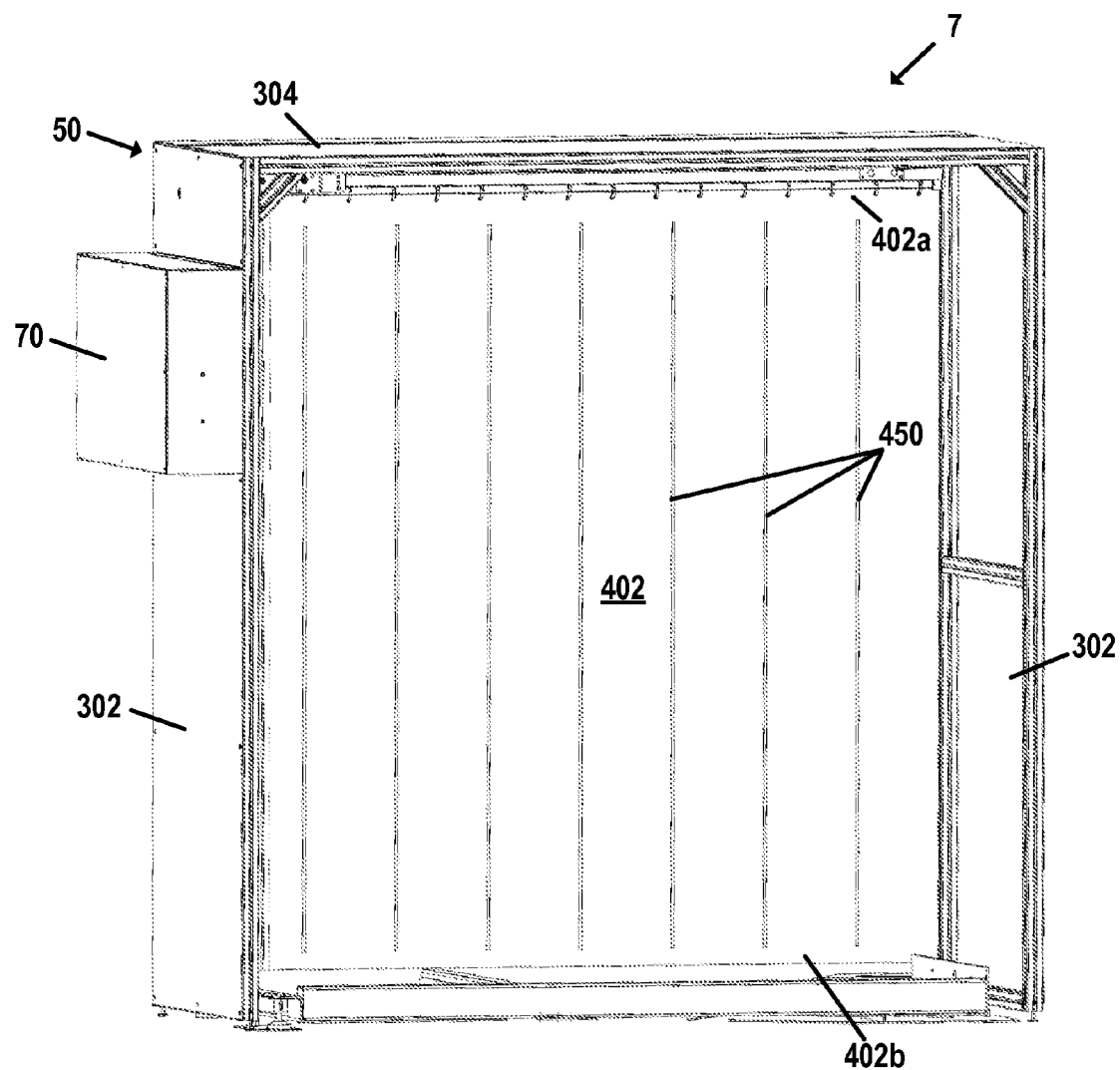
FIG. 14 shows a rear perspective view of a dispenser with the dispenser's rear panel removed according to one embodiment of the present invention.

In certain embodiments, the flexible barrier 402 may also include reinforcing members or devices to provide additional access prevention when the access door 60 is in its closed position. For example, FIG. 14 shows a rear view of the dispenser 7 with the housing's rear panel 306 removed. As shown in the illustrated embodiment of FIG. 14, the flexible barrier 402 includes a plurality of vertical support rods 450. In the illustrated embodiment, the vertical support rods 450 comprise substantially elongated metal rods sewn into the flexible barrier 402. As shown in FIG. 14, the vertical support rods 450 are vertically oriented and are laterally spaced apart across the width of the flexible barrier 402. In various embodiments, the vertical support rods 450 function to prevent an unauthorized user from lifting the lower edge 402*b* of the flexible barrier 402 a substantial distance in order to access items within the interior portion of the housing 50 when the access door 60 is in the closed position.

The access door 60 also functions similarly to the access door 20 when in the open position. For example, in the open position shown in FIG. 10, the vertical support member 410 is moved laterally toward the access opening's second lateral side 310*d*. With the vertical support member 410 moved to the position of FIG. 10, the flexible barrier 402 is compressed into a plurality of folds and does not obstruct access to the interior portion of the housing 50 through the access opening 310.

Figure 15:
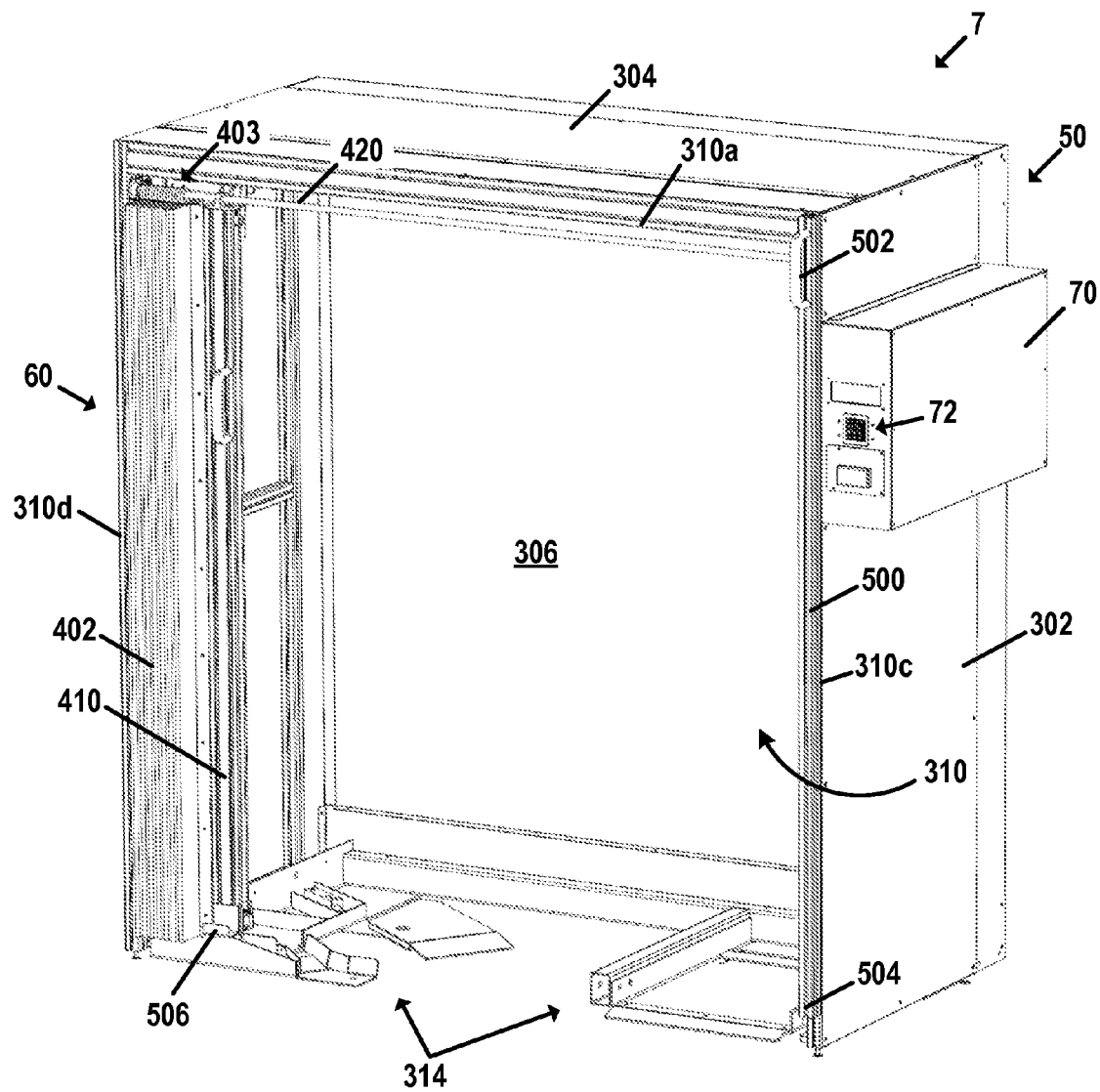
FIG. 15 shows a perspective view of a dispenser having an access door in an open position and a security bar in an access position according to one embodiment of the present invention.

FIG. 15 illustrates another embodiment of the dispenser 7 in which a security bar 500 is provided on the housing 50. As shown in FIG. 7, the security bar 500 is generally rigid and comprised of a high-strength metal material, such as steel or aluminum. However, as will be appreciated from the description herein, the security bar 500 may be comprised of various materials of suitable strength and rigidity. As shown in FIG. 15, the security bar 500 includes a handle 502 and is rotatably connected to the housing 50 by a pin 504 such that it can rotate between an upper, access position and a lower, retention position. In addition, the dispenser's vertical support member 410 includes a u-shaped bracket 506 dimensioned to surround a portion of the security bar 500.

FIG. 15 shows dispenser 7 with the access door 60 in its open position and the security bar 500 in its upper position. As will be appreciated from FIG. 15, with the security bar 500 in its upper position and the access door 60 in its open position, the security bar 500 does not obstruct the dispenser's access opening 310 and user access to the interior portion of the housing 50 is permitted (e.g., such that a storage cart can be wheeled into the dispenser 7 and one or more items can be placed on or removed from the storage cart). In various embodiments, the security bar 500 and housing 50 may include a locking mechanism configured to selectively secure the security bar 500 in its upper position (e.g., an electromechanical locking mechanism controlled by the control system 70 or a manually-operated mechanical locking mechanism).

Figure 16:
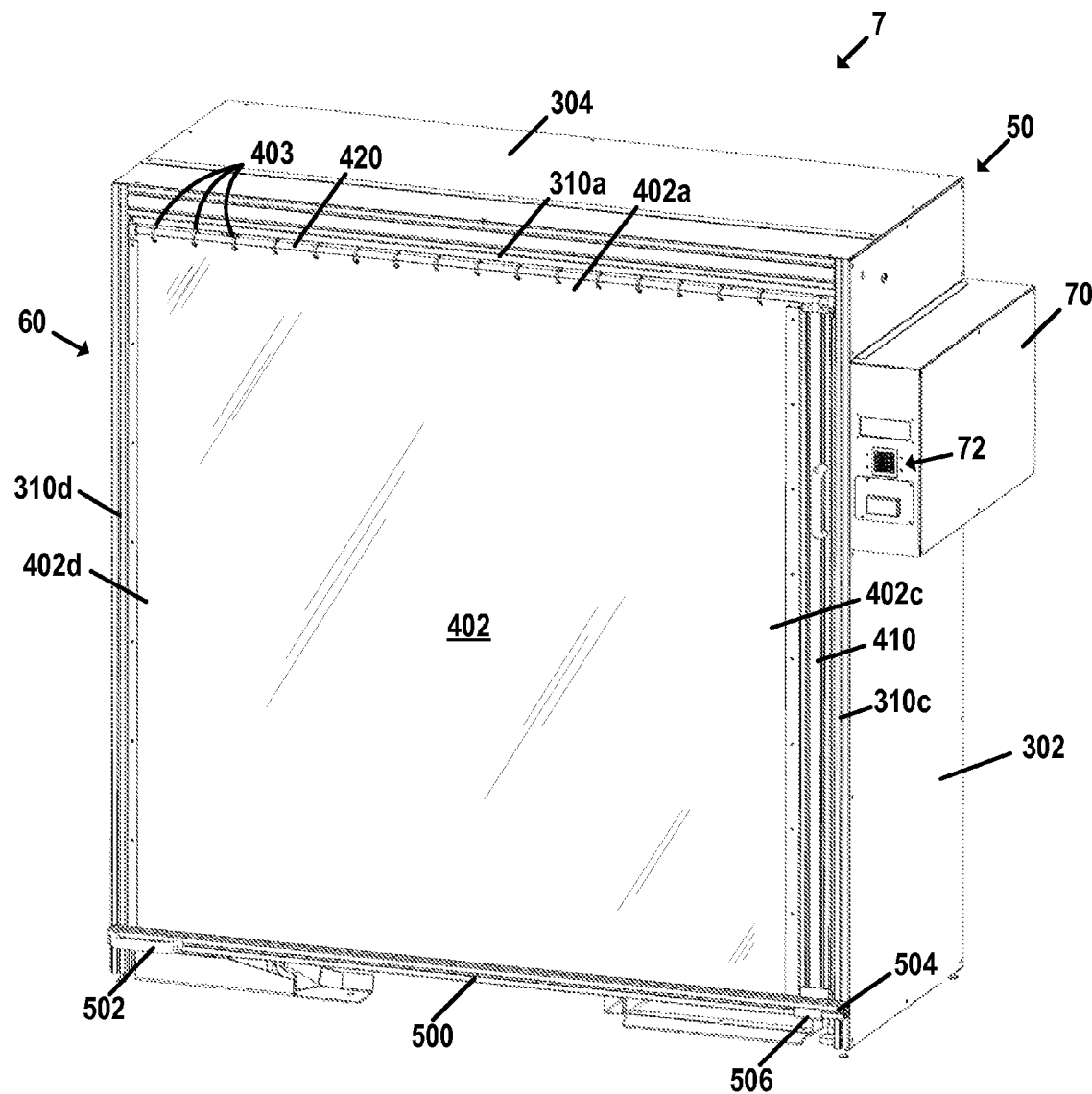
FIG. 16 shows a perspective view of a dispenser having an access door in a closed position and a security bar in a retention position according to one embodiment of the present invention.

FIG. 16 shows the dispenser 7 with the access door 60 in its closed position and the security bar 500 in its lower position. As will be appreciated from FIG. 16, with the security bar 500 in its lower position and the access door 60 in its closed position, the security bar 500 substantially prevents unauthorized users from lifting or otherwise tampering with the bottom edge of the access door's flexible barrier 402. In addition, the vertical support member's u-shaped bracket 506 will engage the security bar 500 if the access door 60 is pulled outward or pushed inward, thereby providing added security for preventing access to the interior portion of the housing 50.

Moreover, in the illustrated embodiment, the access door 60 can be moved to its open position while the security bar 500 remains in its lower position. Accordingly, with the access door 60 in its open position and the security bar 500 in its lower position, user access to the interior portion of the housing 50 is permitted (e.g., to remove items from the dispenser 7 or place items within the dispenser 7). However, when in its lower, retention position, the security bar 500, prevents unauthorized users from removing a storage cartridge positioned within the dispenser, regardless of whether the access door 60 is open or closed. In certain embodiments, the u-shaped bracket 506 is configured such that it does not engage the security bar 500 as the access door 60 is moved between its open and closed positions, thereby reducing friction as the access door 60 is adjusted. In addition, in various embodiments, the security bar 500 and housing 50 may include a locking mechanism configured to selectively secure the security bar 500 in its lower position (e.g., an electromechanical locking mechanism controlled by the control system 70 or a manually-operated mechanical locking mechanism). As will be appreciated from the description herein, in various embodiments, one or more security bars may be provided on the dispenser 7 and configured to move between an access position and retention position in a variety of ways (e.g., sliding, rotating, etc.)

According to various embodiments, the aforementioned components of the access door 60 enable the access door 60 to be easily moved by a user between the open and closed positions of FIGS. 10 and 11. In addition, to provide additional user convenience and access prevention capability, various embodiments of the dispenser 7 may include the biasing system, open locking mechanism, and/or close locking mechanism described above in relation to the dispenser 5. Moreover, as shown in the illustrated embodiments of FIGS. 10 and 11, the dispenser 7 includes a control system 70 having a user interface 72. According to various embodiments, the control system 70 and user interface 72 may be configured to operate in substantially the same manner as the control system 30 and user interface 32 described above. Likewise, various modifications to the dispenser 7 analogous to those discussed above in relation to the dispenser 5 are contemplated.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A dispenser for storing one or more items and providing selective access to the items, the dispenser comprising:
    a housing defining an access opening and an interior portion dimensioned for receiving the one or more items, wherein the access opening defines a first lateral side and a second lateral side;
    one or more upper horizontal support members disposed adjacent an upper perimeter of the access opening and extending at least substantially the width of the access opening from the access opening's first lateral side and to the access opening's second lateral side; and
    an access door disposed adjacent the access opening, the access door comprising:
        a rigid vertical support member slidably engaged to at least one of the one or more upper horizontal support members and configured to slide laterally relative to the one or more upper horizontal support members between the access opening's first lateral side and the access opening's second lateral side;
        a flexible barrier having a first side edge operatively connected to the rigid vertical support member, wherein the flexible barrier comprises a tear-resistant fabric sheet;
        a plurality of door attachment members disposed adjacent an upper edge of the flexible barrier and engaged with at least one of the one or more upper horizontal support members, wherein the plurality of door attachment members are configured to slide relative to the one or more upper horizontal support members and permit the access door to move laterally to:
            (i) a closed position in which the access door prevents access to one or more items stored within the interior portion of the housing through the access opening, and
            (ii) an open position in which the access door permits access to one or more items stored within the interior portion of the housing through the access opening; and
        a close locking mechanism configured to selectably lock the rigid vertical support member adjacent the first lateral side of the access opening to selectably lock the access door in the closed position.

2. The dispenser of claim 1, wherein a second side edge of the flexible barrier is operatively connected to the housing adjacent the second lateral side of the access opening; and
    wherein, when the access door is in the closed position, the rigid vertical support member is positioned adjacent the first lateral side of the access opening and the flexible barrier extends substantially between the first and second lateral sides of the access opening.

3. The dispenser of claim 1, wherein the one or more upper horizontal support members comprise a first upper horizontal support member and a second upper horizontal support member; and
    wherein the rigid vertical support member is slidably engaged with the second upper horizontal support member and is configured to slide laterally relative to the second upper horizontal support member.

4. The dispenser of claim 3, wherein the plurality of door attachment members extend around the first upper horizontal support member such that the door attachment members are able to slide laterally along the first upper horizontal support member; and
    wherein the second upper horizontal support member comprises an upper linear bearing rail and the rigid vertical support member is secured to an upper sliding assembly configured to slide laterally along the upper linear bearing rail.

5. The dispenser of claim 3, wherein the rigid vertical support member is further engaged with the first upper horizontal support member and is configured to slide laterally relative to the first upper horizontal support member, the rigid vertical support member being operatively engaged with the first upper horizontal support member at a point positioned below the rigid vertical support member's engagement with the second upper horizontal support member.

6. The dispenser of claim 3, wherein the rigid vertical support member includes an engaging member extending outwardly from a leading edge of the rigid vertical support member, the engaging member being configured for engaging a portion of the housing when the access door is in the closed position.

7. The dispenser of claim 6, wherein the engaging member comprises a support flange extending laterally outwardly from the rigid vertical support member's leading edge.

8. The dispenser of claim 1, further comprising a security device configured for selectively obstructing at least a portion of the access opening in order to prevent a storage cart positioned within the housing from being removed by an unauthorized user.

9. The dispenser of claim 8, wherein the security device comprises a security bar connected to the housing and configured for moving between an access position, in which a storage cart can be removed from the interior portion of the housing, and a retention position, in which the security bar prevents a storage cart from being removed from the housing.

10. The dispenser of claim 9, wherein, when the security bar is in the retention position, the security bar is further configured to engage the rigid vertical support member where the rigid vertical support member is pulled outwardly from the dispenser and where the rigid vertical support member is pushed inwardly toward the dispenser in order to further prevent unauthorized access to the dispenser's interior portion.

11. The dispenser of claim 1, further comprising a biasing system configured to apply a force biasing the access door to the closed position.

12. The dispenser of claim 11, further comprising an open locking mechanism configured to selectively lock the access door in the open position; and
    wherein, when the access door is unlocked from the open position, the biasing system is configured to drive the access door to the closed position.

13. The dispenser of claim 11, wherein the biasing system comprises a counterweight operatively connected to the rigid vertical support member and configured to apply a force sufficient to pull the rigid vertical support member to the access door's closed position.

14. The dispenser of claim 13, further comprising a damping mechanism configured to damp the motion of the access door as it is moved to its closed position by the biasing system.

15. The dispenser of claim 1, further comprising a control system comprising at least one processor configured to receive user input from a user interface, wherein the control system is configured to generate a control signal that actuates the close locking mechanism in order to unlock the access door in response to receiving valid user input.

16. The dispenser of claim 1, further comprising an open locking mechanism configured to selectively lock the access door in the open position.

17. The dispenser of claim 16, further comprising a control system comprising at least one processor configured to generate a control signal that actuates the open locking mechanism in order to unlock the access door from the open position.

18. The dispenser of claim 17, wherein the control system is configured to generate the control signal in response to user input received via a user input device.

19. The dispenser of claim 17, wherein the control system is configured to generate the control signal after a predefined timing period elapses.

20. The dispenser of claim 1, wherein the access door is configured such that:
    when the access door is in the closed position, the flexible barrier is substantially outstretched in a substantially planar orientation and spans the width of the access opening; and
    when the access door is in the open position, the flexible barrier is gathered into a plurality of folds.

21. The dispenser of claim 1, wherein the flexible barrier includes one or more vertical support rods attached to the flexible barrier and extending vertically between the flexible barrier's upper edge and lower edge.

22. The dispenser of claim 1, wherein the dispenser is configured for receiving a movable cart into the interior portion of the housing through the housing's access opening when the access door is the open position, the movable cart being configured for storing the one or more items.

* * * * *